(12) United States Patent
Glazer et al.

(10) Patent No.: US 6,824,866 B1
(45) Date of Patent: Nov. 30, 2004

(54) POROUS SILICA SUBSTRATES FOR POLYMER SYNTHESIS AND ASSAYS

(75) Inventors: Marc I. Glazer, Stanford, CA (US); Jacqueline A. Fidanza, Mountain View, CA (US); Glenn McGall, Mountain View, CA (US); Curtis W. Frank, Cupertino, CA (US); Richard Vinci, Easton, PA (US)

(73) Assignee: Affymetrix, Inc., Santa Clara, CA (US)

( * ) Notice: Subject to any disclaimer, the term of this patent is extended or adjusted under 35 U.S.C. 154(b) by 0 days.

(21) Appl. No.: 09/545,207

(22) Filed: Apr. 7, 2000

Related U.S. Application Data

(60) Provisional application No. 60/128,402, filed on Apr. 8, 1999.

(51) Int. Cl.[7] .......................... B32B 5/22; C07H 21/00
(52) U.S. Cl. .................. 428/317.9; 428/304.4; 428/315.5; 428/315.7; 428/325; 428/312.2; 428/312.6; 428/312.8; 528/10; 536/23.1; 536/24.3; 536/25.3
(58) Field of Search .................. 428/304.4, 317.9, 428/315.5, 315.7, 325, 312.2, 312.6, 312.8; 528/10; 536/23.1, 24.3, 25.3

(56) References Cited

U.S. PATENT DOCUMENTS

| | | | |
|---|---|---|---|
| 3,640,093 A | 2/1972 | Levene et al. | 65/134 |
| 4,220,461 A | 9/1980 | Samanta | 65/22 |
| 4,426,216 A | 1/1984 | Satoh et al. | 65/18.1 |
| 4,528,010 A | 7/1985 | Edahiro et al. | 65/18.1 |
| 4,765,818 A | 8/1988 | Che et al. | 65/18.1 |
| 5,009,688 A | 4/1991 | Nakanishi | 65/18.3 |
| 5,143,854 A | 9/1992 | Pirrung et al. | 436/518 |
| 5,147,631 A * | 9/1992 | Glajch et al. | 424/9 |
| 5,252,743 A | 10/1993 | Barrett et al. | 548/303.7 |
| 5,288,514 A | 2/1994 | Ellman | 427/2 |
| 5,384,261 A | 1/1995 | Winkler et al. | 436/518 |
| 5,405,783 A | 4/1995 | Pirrung et al. | 436/518 |

(List continued on next page.)

FOREIGN PATENT DOCUMENTS

| | | |
|---|---|---|
| EP | 0 348 041 A | 12/1989 |
| EP | 0 368 279 | 5/1990 |
| JP | 8151232 A | 6/1996 |
| WO | WO89/10977 | 11/1989 |
| WO | 89/11548 | 11/1989 |
| WO | 92/10092 | 9/1992 |
| WO | 92/20702 | 11/1992 |
| WO | 95/11995 | 5/1995 |
| WO | 97/10365 | 3/1997 |
| WO | WO 97 39151 A | 10/1997 |
| WO | WO 98 41534 A | 9/1998 |

OTHER PUBLICATIONS

*Sol–Gel Science: The Physics and Chemistry of Sol–Gel Processing* (C. J. Brinker and G. W. Scherer, editors) Academic Press, 1990, pp. 787–797.

H. Scholze "New Possibilities for Variation of Glass Structure", *J. Non–Crystalline Solids* 73:669–680 (1985).

(List continued on next page.)

*Primary Examiner*—Terrel Morris
*Assistant Examiner*—Hai Vo
(74) *Attorney, Agent, or Firm*—Banner & Witcoff, Ltd.

(57) ABSTRACT

Methods are provided for making and using thin films of porous silica substrates to synthesize arrays of polymers. Methods are also provided for assaying such polymers on porous silica substrates. The porous silica substrates offer an increase in array density and signal enhancement over conventional flat glass substrates. Examples of polymers that can be synthesized and assayed include biological polymers such as nucleic acids, polynucleotides, polypeptides, and polysaccharides. Arrays of nucleic acids or polynucleotides can be used for a variety of hybridization-based experiments such as nucleic acid sequence analysis, nucleic acid expression monitoring, nucleic acid mutation detection, speciation, effects of drug therapy on nucleic acid expression, among others.

63 Claims, 5 Drawing Sheets

U.S. PATENT DOCUMENTS

| | | | |
|---|---|---|---|
| 5,409,683 A | 4/1995 | Tillotson et al. | 423/338 |
| 5,412,087 A | 5/1995 | McGall et al. | 536/24.3 |
| 5,424,186 A | 6/1995 | Fodor et al. | 435/6 |
| 5,445,934 A | 8/1995 | Fodor et al. | 435/6 |
| 5,451,683 A | 9/1995 | Barrett et al. | 548/302.7 |
| 5,510,270 A | 4/1996 | Fodor et al. | 436/518 |
| 5,527,681 A | 6/1996 | Holmes | 435/6 |
| 5,541,061 A | 7/1996 | Fodor et al. | 435/6 |
| 5,545,531 A | 8/1996 | Rava et al. | 435/6 |
| 5,547,839 A | 8/1996 | Dower et al. | 435/6 |
| 5,571,639 A | 11/1996 | Hubbell et al. | 430/5 |
| 5,599,695 A | 2/1997 | Pease et al. | 435/91.1 |
| 5,624,711 A | 4/1997 | Sundberg et al. | 427/261 |
| 5,624,875 A | 4/1997 | Nakanishi et al. | 501/39 |
| 5,631,734 A | 5/1997 | Stern et al. | 356/317 |
| 5,639,603 A | 6/1997 | Dower et al. | 435/6 |
| 5,677,195 A | 10/1997 | Winkler et al. | 436/518 |
| 5,710,000 A | 1/1998 | Sapolsky et al. | 435/6 |
| 5,744,101 A | 4/1998 | Fodor et al. | 422/131 |
| 5,744,305 A | 4/1998 | Fodor et al. | 435/6 |
| 5,770,358 A | 6/1998 | Dower et al. | 435/6 |
| 5,795,716 A | 8/1998 | Chee | 435/6 |
| 5,800,992 A | 9/1998 | Fodor et al. | 435/6 |
| 5,831,070 A | 11/1998 | Pease et al. | 536/25.3 |
| 5,837,832 A | 11/1998 | Chee et al. | 536/22.1 |
| 5,843,655 A | 12/1998 | McGall | 435/6 |
| 5,843,767 A * | 12/1998 | Beattie | 422/68.1 |
| 5,858,462 A | 1/1999 | Yamazaki | 427/226 |
| 5,858,659 A | 1/1999 | Sapolsky et al. | 435/6 |
| 5,861,242 A | 1/1999 | Chee et al. | 435/6 |
| 5,871,650 A * | 2/1999 | Lai et al. | 21/653 |
| 5,911,658 A * | 6/1999 | Yoldas | 252/62 |
| 5,919,523 A | 7/1999 | Sundberg et al. | 427/333 |
| 5,958,577 A * | 9/1999 | Sugimoto et al. | 428/333 |
| 5,981,956 A | 11/1999 | Stern | 250/458.1 |
| 6,025,601 A | 2/2000 | Trulson et al. | 250/461.2 |
| 6,040,138 A | 3/2000 | Lockhart et al. | 435/6 |
| 6,183,851 B1 * | 2/2001 | Mishima | 428/304.4 |
| 6,228,575 B1 | 5/2001 | Gingeras et al. | 435/5 |
| 6,262,216 B1 * | 7/2001 | McGall | 528/10 |

OTHER PUBLICATIONS

McGall et al., "The Efficiency of Light–Directed Synthesis of DNA Arrays on Glass Substrates", *J. Am. Chem. Soc.* 119:22, pp. 5081–5090 (1997).

McGall et al., "Light–Directed Synthesis of High–Density Oligonucleotide Arrays Using Semiconductor Photoresists", *Proc. Natl. Acad. Sci.* 93, pp. 13555–13560 (1996).

Pease et al., "Light–generated Oligonucleotide Arrays for Rapid DNA Sequence Analysis", *Proc. Natl. Acad. Sci.* 91, pp. 5022–5026 (1994).

Proudnikov, et al. Immobilization of DNA in Polyacrylamide Gel for the Manufacture of DNA and DNA–Oligonucleotude Microchips, *Anal. Biochem.* 259, pp. 34–41 (1998).

Velev, et al., "Porous silica via colloidal crystallization" *Nature* 389, pp. 447–448 (1997).

Antonietti, et al., "Synthesis of Mesoporous Silica with Large Pores and Bimodal Pore Size Distribution by Templating of Polymer Latices", (1998) *Advanced Materials* 10:2, pp. 154–159.

Wijnhoven, et al., "Preparation of Photonic Crystals Made of Air Spheres in Titania", *Science* 281, pp. 802–804 (1998).

Subramania, et al., "Optical Photonic Crystals Fabricated From Colloidal Systems", *Applied Physics Letters* 74:26, pp. 3933–3935 (1999).

Subramania, et al., "Ordered Macroporous Materials by Colloidal Assembly: A Possible Route to Photonic Bandgap Materials", *Advanced Materials*, 11:15, pp. 1261–1265 (1999).

Glazer, et al. in *Organic/Inorganic Hybrid Materials II*, vol. 576 (L.C. Klein, L.F. Francis, M.R. De Guire, J.E. Mark, editors) (proceedings of the Materials Research Society meeting, Spring 1999) pp. 371–376.

Holland et al., "Synthesis of Macroporous Minerals with Highly Ordered Three–Dimensional Arrays of Spheroidal Voids", *Science*, 281, pp. 538–540 (1998).

Arshady et al., "Peptide Synthesis. . . . , " *J. Chem. Soc. Perkin. Trans.*,1:529–537 (1981).

Chaiken, "Semisynthetic Peptides and Proteins, " *CRC Crit. Rev. Biochem.*, 11:255–301 (1981).

Chee et al., "Accessing Genetic Information with High–Density DNA Arrays, " *Science,* 274:610–614 (1996).

Cho et al., "An Unnatural Biopolymer, " *Science,* 261:1303–1305 (1993).

de Saizieu et al., "Bacterial Transcript Imaging by Hybridization of Total RNA to Oligonucleotide Arrays, " *Nature Biotechnology,* 16:45–48 (1998).

Fodor et al., "Light–Directed, Spatially Addressable Parallel Chemical Synthesis, " *Science,* 251: 767–773 (1991).

Forman et al., "Thermodynamics of Duplex Formation and Mismatch Discrimination on Photolithographically Synthesized Oligonucleotide Acids, " *Am. Chem. Soc. (ACS) Symposium Series 682,* Chp. 13, pp. 206–228 (1998).

Kaiser et al., "Peptide and Protein Synthesis by Segment Synthesis–Condensation, " *Science,* 243:187–192 (1989).

Kent, "Chemical Synthesis of Peptides and Proteins, "*Ann. Rev. Biochem.*, 57:957–989 (1988).

Lockhart et al., "Expression Monitoring by Hybridization to High–Density Oligonucleotide Arrays, " *Nature Biotechnology,* 14:1675–1680 (1996).

Merrifield, "Solid Phase Synthesis, " *Science,* 232:341–347 (1986).

Merrifield, "The Total Synthesis of an Enzyme with Ribonuclease A Activity, " *J. Am. Chem. Soc.,* 91:501–502 (1969).

"Chemistry for Automated DNA Synthesis, " *PCR–Mate EP Model 391 DNA Synthesizer User's Manual,* Applied Biosystems, Section 6, pp. 1–24 (2002).

* cited by examiner

POROUS SILICA SUBSTRATES FOR POLYMER SYNTHESIS AND ASSAYS

CROSS REFERENCE TO RELATED APPLICATIONS

This application claims the benefit of U.S. Provisional Patent Application Ser. No. 60/128,402, filed Apr. 8, 1999, the disclosure of which is incorporated herein by reference in its entirety.

TECHNICAL FIELD

This invention pertains to preparation and use of very high surface area porous substrates that can be used to synthesize high density arrays of polymers.

BACKGROUND

Porous silica glass has been known for quite some time. U.S. Pat. No. 4,220,461 provides a historical perspective and discussion on the development of silica-rich phase-separable porous glass. Various methods for the manufacture of phase-separable porous glass are reviewed in U.S. Pat. No. 4,528,010. Both of these references are incorporated by reference in their entireties for all purposes.

BRIEF DESCRIPTION OF THE INVENTION

The present invention relates to a porous substrate and methods for making and using the porous substrate. The porous substrate provides an increased surface area for polymers to attach to the substrate. Such porous substrates are often used to make an array of polymers, such as for genetic diagnostic purposes. The polymers may be placed or fabricated on the porous substrate by various methods.

The polymers can include those of biological interest such as nucleic acids, polynucleotides, proteins, polypeptides, polysaccharides, oligosaccharides, mixtures of these or other polymers on an array and combinations of the above polymer units in individual polymers. The porous substrates thus are useful in, for example, glass technology, polymer chemistry, molecular biology, medicine, and medical diagnostics.

The porous substrate generally has at least two regions, a support region and a porous region. The support region, which can serve as an underlayer region, basically provides mechanical support for ease of handling of a porous region. The porous region may be for example a layer (film). The support region can be selected or processed to provide additional features in the finished porous substrate. One advantage of using a porous region with higher surface area to make an array is that the array can be functionalized with a much higher density of polymers for a given two dimensional area without changing the spacing between polymers on the surface of the porous substrate.

One embodiment of this invention provides a primarily inorganic porous substrate including a support region, and a porous region in contact with the support region. The porous region for example includes pores with a pore size of 1–500 nm, or 2–500 nm, the porous region having a porosity of, e.g., 10–90%, 20–80%, or 70–90%, and a porous surface thickness of 0.01–20 $\mu$m, wherein the porous region has a surface capable of forming arrays of polymers thereon. The porosity is generally, for example, "open", that is, some pores are connected to others to allow the infusion of polymers or other fluids. Not all the pores need to connect to another, that is, some of the pores may be closed. What is meant by "primarily inorganic" is that a small amount of organic material may remain in the porous region of the substrate, or may be intentionally applied onto the surface(s) of the porous region.

In one embodiment, a porous substrate is provided comprising:
  a support region; and
  a porous region on the support region, the porous region being primarily inorganic and having a surface capable of forming a polymer array thereon, the porous region comprising pores of a pore size of about 2 nm–500 nm or 1000 Angstroms to 500 nm, a porosity of about 10–90%, and a thickness of about 0.01 $\mu$m to about 70 $\mu$m.

The porous region can be formed by an additive method, which can include the application of colloidal silica on the support region. The additive method also may include the application of alkoxysilane on the support region. The porous region may comprise silica. The porous region may further comprise organic polymer of less than or equal to about 10% mole fraction. The porous region may comprise a plurality of pores, each of the plurality of pores having a size of from about 2 to about 100 nm. The porous region may comprise a plurality of pores, each of the plurality of pores having a size of from about 2 to about 50 nm. The porous region has, for example, a porosity of from about 20–80%, or 50–70%. The porous region for example comprises a plurality of particles, each of the plurality of particles having a size from about 5–500 nm, 5–200 nm, or 70–100 nm. The porous region has, for example, a thickness from about 0.1–1 microns, or about 0.1 $\mu$m to about 0.5 $\mu$m, or about 1 $\mu$m to about 20 $\mu$m.

An organic polymer may coat silica particles of the porous region. The porous region may be silylated with a silyating agent, such as N,N-bis(hydroxyethylaminopropyl) triethoxysilane and glycidoxypropyl trimethoxy silane. The porous region may be formed by codepositing an organic template material with silica, followed by removing the organic template material. The organic template material for example comprises particles of about 10–100 nm and the silica comprises particles of about 7–100 nm. The organic template particle size can be about equal to a silica particle size. The silica particle size is for example less than or equal to about ⅔ an organic template particle size. The silica particle size is in one embodiment, less than about 10% of an organic template particle size. The organic template material can be deposited in a volume ratio to the silica of about 10:1 to 1:10, e.g., 2:1. The organic template material is in one embodiment removed using a baking process at a temperature of above about 150° C. The silica may be densified using an annealing process. The porous region has in one embodiment an effective surface area about 15–40 times a flat substrate with an equivalent two dimensional structure. In one embodiment, the porous region is formed by a subtractive method. The organic template polymer may be a latex polymer. The porous substrate may comprise phase-separable glass, a surface portion of the phase-separable glass being treated to form the porous layer. The phase-separable glass may comprise for example a sodium borosilicate glass. The sodium borosilicate glass may be been annealed and leached to provide the porous layer having a thickness of about 70 microns and comprised of a plurality of pores, at least some of the plurality of pores having a pore size greater than about 1000 Å. The porous region has, e.g., an effective surface area about 50–400 times a flat substrate with an equivalent two dimensional structure.

The porous substrate may further comprise a high density array of polymers, such as nucleic acids immobilized on the surface.

In another embodiment, a porous substrate is provided comprising:

a support region; and a porous region on the support region, said porous region being about 0.1–0.5 microns thick, wherein the porous layer comprises an unsintered matrix formed from at least colloidal silica having a particle size of about 70–100 microns, the unsintered matrix defining at least a plurality of open pores having a pore size of about 10–20 nm, and wherein the porous layer has a porosity of of about 10–90%.

In one embodiment, a method of forming a porous substrate is provided, the method comprising:

providing a substrate material comprising a surface;

dipping the substrate material in a solution including colloidal silica and a carrier, the colloidal silica having a particle size of about 12–100 nm; and withdrawing the substrate material to provide an unsintered porous layer having a thickness of about 0.1–1 microns and a porosity of of about 10–90% on the substrate material.

Also provided is a method of forming a porous substrate, the method comprising:

providing a substrate material comprising a surface;

applying a solution including colloidal silica and a carrier to the surface of the substrate material, the colloidal silica having a particle size of about 12–100 nm;

spinning the substrate material and the applied solution to achieve a spun layer on the substrate material; and removing the carrier from the spun layer to provide an unsintered porous layer having a thickness of about 0.1–1 microns and a porosity of about 10–90% on the substrate material.

Another embodiment is a method of forming a porous substrate comprising different monomer sequences, the method comprising:

immobilizing different monomer sequences on a porous substrate.

In another embodiment, there is provided a method of synthesizing polymers on a porous substrate, the method comprising:

a) generating a pattern of light and dark areas by selectively irradiating at least a first area of a surface of a porous substrate, said surface comprising immobilized monomers on said surface, said monomers coupled to a photoremovable protective group, without irradiating at least a second area of said surface, to remove said protective group from said monomers in said first area;

b) simultaneously contacting said first area and said second area of said surface with a first monomer to couple said first monomer to said immobilized monomers in said first area, and not in said second area, said first monomer having said photoremovable protective group;

c) generating another pattern of light and dark areas by selectively irradiating with light at least a part of said first area of said surface and at least a part of said second area to remove said protective group in said at least a part of said first area and said at least a part of said second area;

d) simultaneously contacting said first area and said second area of said surface with a second monomer to couple said second monomer to said immobilized monomers in at least a part of said first area and at least a part of said second area; and e) performing additional irradiating and monomer contacting and coupling steps so that a matrix array of different polymers is formed on said surface, whereby said different polymers have sequences and locations on said surface defined by the patterns of light and dark areas formed during the irradiating steps and the monomers coupled in said contacting steps.

The monomers are for example, nucleotides, amino acids, or monosaccharides. The substrate may have linker molecules on its surface.

There also is provided a method of forming polymers having different monomer sequences on a porous substrate, the method comprising:

providing a porous substrate comprising a linker molecule layer thereon, said linker molecule layer comprising a linker molecule and a protective group;

applying a barrier layer overlying said linker molecule layer, said applying step forming selected exposed regions of said linker molecule layer;

exposing said selected exposed regions of said linker molecule layer to a deprotecting agent to remove the protective group; and coupling selected monomers to form selected polymers on the substrate.

The deprotection agent may be, for example, in the vapor phase or liquid phase, and may be, for example an acid, such as trichloroacetic acid, dichloroacetic acid, or HCl. The monomers are for example nucleotides, amino acids, or monosaccharides.

In another embodiment, there is provided a method for detecting a nucleic acid sequence, the method comprising:

(a) providing an array of nucleic acids bound to the porous substrate;

(b) contacting the array of nucleic acids with at least one labeled nucleic acid comprising a sequence substantially complementary to a nucleic acid of said array, and (c) detecting hybridization at least the labeled complementary nucleic acid to nucleic acids of said array.

In one embodiment, the porous substrates comprising arrays may be used to screen for a previously identified polymorphic variant in a target nucleic acid sequence, or for a target such as a human immunodeficiency virus sequence. Nucleic acids such as a p53 gene, an HIV RT gene, a CFTR gene, or a cytochrome p450 gene can be screened for. The array may include, for example, at least 3200 polynucleotide probes, or, e.g., at least 10,000 polynucleotide probes, or at least 50,000 probes. The probes may be, for example, 9 to 21 nucleotides in length.

DESCRIPTION OF THE INVENTION

Figure 1:
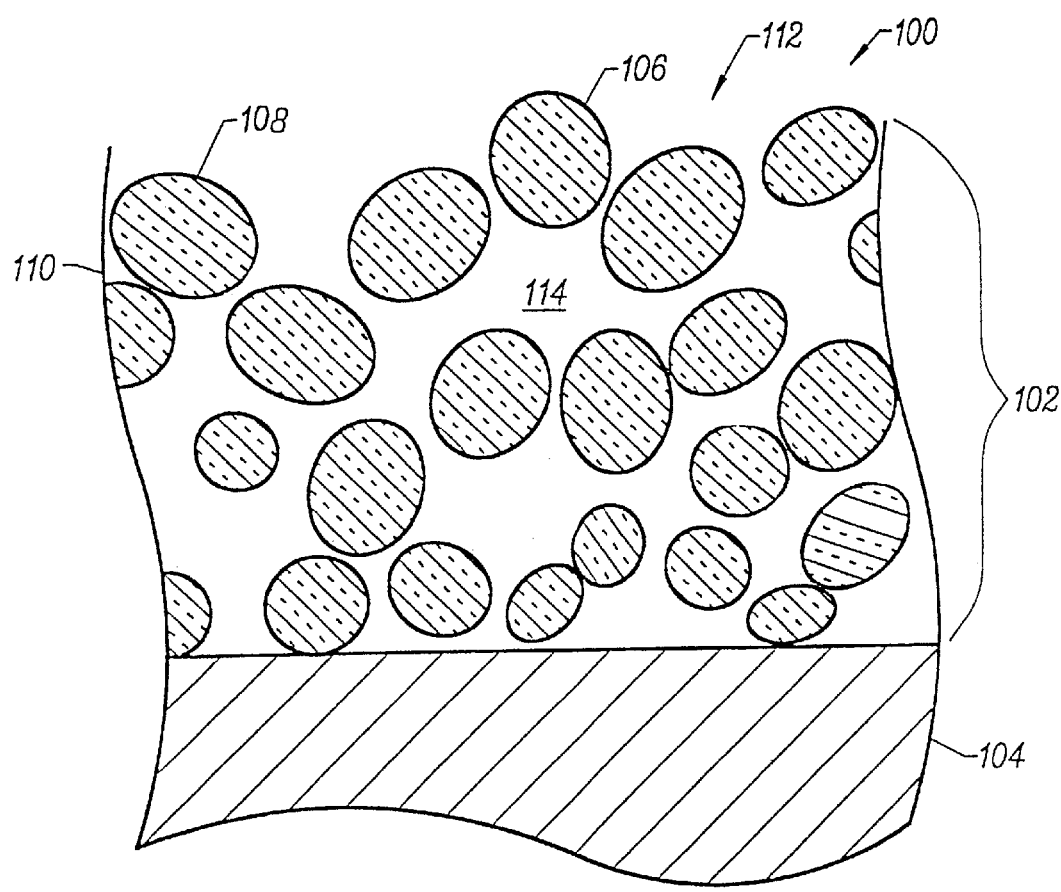
FIG. 1 is a simplified cross section of a portion of a porous substrate with a porous region formed from particles according to one embodiment of the invention.

The present invention relies on many patents, applications and other references for details known to those of the art. Therefore, when a patent, application or other reference is cited or repeated below, it should be understood that it is incorporated by reference in its entirety for all purposes as well as for the proposition that is recited.

The present invention provides a porous substrate and methods for making and using the porous substrate. The porous substrate provides a large surface area for polymers to be attached to make an array. The polymers may be placed or fabricated on the array by various methods. A porous layer is formed on a substrate material, and in some embodiments, the porosity, pore size, and thickness of the porous layer is chosen according to desired functionalization characteristics. Porous substrates are generated by creating a 3D matrix to increase the surface area and therefore increase the number of sites available for array synthesis in the same lateral dimensions. One advantage in using a porous layer to increase the effective surface area is to make an array that can be functionalized with a much higher density of polymers for a given two dimensional, or "flat" area without changing the spacing between cells of the array on the surface of the substrate. The effective surface area is the surface area of the porous region that is available for adsorption of polymer molecules or for polymer synthesis, of example.

The support region can be, for example sodalime glass, borafloat glass, sodium borosilicate glass, fused silica, or a polymer, such as plastic. When the porous layer is silica, it can be manufactured by many means. Two exemplary ways to form the porous region are by the addition of material (e.g. deposition), and by removal of material (e.g. selective etching).

In additive methods, a porous region is formed on the surface of the underlying substrate to increase the effective surface area. The porous region can be formed from deposition of any or all of the following with or without catalysts in appropriate solvent and ratios. For example, the porous region can be formed from colloidal silica, an organo-silicon compound, such as tetramethoxysilane (TMOS), metal alkoxides, silsesquioxanes, or other silanes, or combinations of these materials typically used in sol gel processes. See C. J. Brinker, Sol-Gel Science, Academic Press, Boston, 1990. With these types of precursors, parameters such as solution composition, concentration, pH, aging time, and temperature can be used to tailor the morphology (pore size, porosity, thickness) of the porous region that is formed. Additionally, there can be combinations of the above techniques to provide the same eventual result (and there can be combinations in the additive and subtractive techniques to achieve similar results for other purposes). Also, other inorganic materials can be used in either of the same forms as above (such as aluminum or titanium-based materials).

Furthermore, the porous region matrix can be "templated". In a templating process, a sacrificial material, such as a polymer, is deposited with the matrix and then burned out, leaving behind a porous structure with selected characteristics. (Note that a porous region can also be formed without templating). The template material can be any of the following, a preformed polymer, such as a polystyrene latex, polymers dissolved in solution, or a combination of these materials. The bum-out process, typically done by heating in air, can be carried out at temperatures above 150° C. up to the melting point (or glass transition temperature, if appropriate) of the material that will form the matrix for the porous layer. After the templating material is burned out, the matrix material can be sintered together. Those skilled in the art will appreciate that the term "sintering" (or "annealing" in some contexts) is used to describe a time-temperature processes for heating glass or other particles to cause them to join. Whether the process is strictly solid state, or involves some amount of material liquefaction or softening, is not essential if a porous structure results. Time and temperature of the sintering process can be varied to achieve different amounts of densification and pore characteristics. Post-treatments after annealing can be used to clean the surface in preparation for array synthesis, such as cleaning in a solution of sulfuric acid and hydrogen peroxide ("piranha solution") or sodium hydroxide. The porous region matrix particles and templating particles can be applied to the surface of the underlying substrate individually, or as a pre-agglomerated mass.

A porous region, such as a porous layer or film can be formed on a surface of the underlying substrate by a variety of processes, such as spin-coating, dip-coating, spraying (aerosol), individual spots deposited on surface, use of barriers (physical or chemical) to specifically deposit coatings into channels, pads, spots, or patterned surfaces. It should be understood that the porous region or layer can be created in various forms, shapes, or areas, or over the entire surface.

In preferred embodiments, film thickness can be modulated by altering either or both of the precursors or layer formation conditions. For example, the weight percent of solids in the reagents listed above (e.g., about 10 wt. % to 40 wt. % solution of colloidal silica) can alter the layer thickness. Similarly, performing multiple depositions can build up the layer thickness. Additional processing might be done between application of successive layers of reagents, such as baking the substrate to remove solvents from the film before the next application of reagents. Film thickness can also be altered by modulating the spin or deposition speed, for example, slower speeds yielding thicker films and faster speeds yielding thinner films. Also, altering the pull speed out of the dip-coating bath can affect layer thickness, as slower speeds yield thinner films and faster speeds yield thicker films. One can also control the solution conditions to affect the film thickness. For example, when using the TMOS approach, the solution can be caused to begin gelling, which increases the viscosity and therefore the thickness of the deposited layer.

The coatings, particles or other components can be spun onto the substrate surface, the substrate can be dipped in a solution containing the above reagents, the reagents can be sprayed onto the surface of the substrate, or applied by other methods. The substrate can be treated to create areas of high porosity over the entire surface of the substrate or just in select locations, such as by spotting reagents in grids, circular spots, areas, cells or any shape that is preferred (see U.S. Pat. Nos. 5,744,305; 5,445,934; and 6,040,138). When the porosity is high and the pores or particles are small, it minimizes the light scattering properties when read by an instrument that uses optical properties to detect a reaction (see U.S. Pat. Nos. 5,744,305; 5,981,956; and 6,025,601).

A subtractive approach can also be used to increase the porosity of the substrate. For example, a porous region can be etched into the surface of the substrate (i.e. the material at the surface of what will become the underlying substrate). The surface can be prepared as etched glass, such as phase-separating sodium borosilicate glass, techniques for which are known in the art. In a particular embodiment of the subtractive approach to forming a porous substrate, the pore size can be further controlled by the annealing time and temperature of an annealing step performed before the etch (longer annealing, higher temperatures increase pore size). Also, the depth of the porous region can be controlled by etching parameters (solution concentration, composition, time, etc.) in accordance with the substrate material.

In some embodiments, the silica substrate has an organic polymer content of less than or equal to 10% mole fraction. In some embodiments, an organic polymer coats the porous substrate. In some embodiments, the porous substrate is coated with a silane compound capable of linking with a polymer, such as glycidoxypropyl-trimethoxysilane or with N,N-bis(hydroxyethylaminopropyl)triethoxysilane.

In either the subtractive or additive techniques, it is desirable to increase the effective surface area of the underlying substrate so that more polymers can be attached to the surface. In one embodiment, the pore size is at least 2, 5, 10, 15, 20, 25, 30, 50, 75, 100, 200, 250, or 500 nanometers. In one embodiment, the largest pore size is 750, 800, 900, or 1,000 nanometers. It is understood that not all pores will be of precisely the same size, but rather will fall within a range in a given porous layer. The numbers used are merely examples of the approximate average pore diameter. The effective surface area can be expressed in units of meters of surface area per gram of layer deposited. In one embodiment, at least 15, 20, 25, 30, 50, 75, 100, 200, 250, 500 meters of surface area is per gram of layer deposited is formed, and not more than 750, 800, 900, or 1,000 meters of surface area per gram of layer deposited.

The effective surface area can also be expressed as a factor of area enhancement over the flat surface area of the underlying substrate. For example, if the flat surface area is expressed as "1", the increase in the effective surface area is for example at least 2, 5, 10, 15, 20, 25, 30, 50, 75, 100, 200, 250, 500, 750, or 1,000 times the flat surface area. Porosity is for example expressed as at least 10, 20, 30, 40, 50, 60, 70, 80 or 90% of the surface of the substrate actually treated. Note that when a film is deposited on a support material, the "porosity" refers to the porosity of the film. The porosity of the layer is defined as the space occupied by void divided by the sum of the space occupied by both solid material and void within the layer. The array may contain areas that have not been treated to increase the surface area or the whole surface can be treated, or selected areas might be treated differently. A porous region formed by depositing colloidal silica for example has a thickness of about 0.01–20 microns, or about 0.1–1.0 microns, about 0.1–0.5 microns, or about 0.1 to 10 microns. It was found that this layer thickness provided good surface area enhancement for processes such as bioassay and biosynthesis, and could be reliably fabricated according to methods of the present invention.

In a preferred embodiment, the present invention is a porous silica substrate that is useful for the manufacture of an array of polymers. Polymer arrays and their uses are well described in many patents and applications. Example uses of polymer arrays include gene expression monitoring, discovery of polymorphisms, genotyping, diagnostics, and affinity columns. See the following, which are incorporated by reference in their entireties for all purposes. See U.S. Pat. Nos. 5,677,195, 5,631,734, 5,624,711, 5,599,695, 5,510,270, 5,445,934, 5,451,683, 5,424,186, 5,412,087, 5,405,783, 5,384,261, 5,252,743 and 5,143,854; and U.S. application Ser. No. 08/388,321, filed Feb. 14, 1995 now U.S. Pat. No. 5,766,101, the disclosures of each of which are incorporated herein. Uses of these polymer arrays are described in U.S. Pat. Nos. 5,795,716 5,800,992, and 6,040,138.

Porous silica has been produced for other uses, such as an intermediate form of a silica glass article. A process according to the present invention utilizes a similar removal method with a phase-separable glass body (substrate) in combination with an etching process and possibly post-etch thermal treatment(s) to form a porous layer on the underlying substrate. The removal method involves (1) forming an article of desired shape from a parent sodium borosilicate glass; (2) thermally treating the glass article at a temperature of 500–600° C. to separate the glass into a silica-rich phase and a silica-poor phase; (3) dissolving or leaching the silica-poor phase with acid to provide a porous structure composed of the silica-rich phase; and (4) washing to remove leaching residue, and then drying.

Another method according to the present invention uses "sol-gel" in a deposition process to prepare a porous substrate at moderate temperatures. Production of porous inorganic oxide glass by the sol-gel process are described in U.S. Pat. Nos. 3,640,093 and 4,426,216. See also Scholze et al., *J. Non-Crystalline Solids*, 73: 669 (1985). The sol-gel procedure involves the formation of a three-dimensional network of metal oxide bonds at room temperature by a hydrolysis-condensation polymerization reaction of metal alkoxides, followed by low temperature dehydration. The resultant porous glass structure optionally can be sintered at elevated temperatures. More recently, U.S. Pat. No. 4,765,818 described the sol-gel preparation of microporous glass monoliths having 0.1–2 moles of trioxane per mole of tetraalkoxysilane, and reported that the glass displayed superior optical properties.

Advantages of creating porous films through sol-gel processing include that the films can be deposited and processed easily, are inert to most chemicals, and can be created with a wide range of morphology and surface chemistry.

Methods of synthesis of arrays of polymers, each polymer comprising a plurality of monomers, are described in U.S. Pat. No. 5,744,305 ('305) or U.S. Pat. No. 5,831,070. "Monomer" may be, for example, a member of the set of individual molecules which can be joined together to form a larger polymer. Monomers can include individual units of a polymer (such as one nucleotide) or can be larger individual units (such as dimers, trimers, and higher) to make up a larger polymer by sequential addition of these larger units. Polymers of all types include analogous or mimics of the natural polymer units. Predefined or known region means a localized area on a surface that contains a polymer. The region may have a convenient shape, e.g., circular, rectangular, elliptical, wedge-shaped, etc. For the sake of brevity herein, "predefined or known regions" are sometimes referred to simply as "regions." Many synthesis methods can be used to apply polymers to these regions. These regions are the sized as shown in '305 and U.S. Pat. No. 5,445,934 ('934). Exemplary region sizes are between 1, 5, 10, 20, 25, 30, 40 and 50 microns square. Densities of the regions per square centimeter are shown in '305 and '934. For example, there are 10, 50, 100, 200, 400, 500, 700, $10^3$, $10^4$, $10^5$, $10^6$, and $10^7$ different regions per square centimeter. Primarily in one embodiment refers to about 90% of the adjective it modifies. Thus, in one embodiment, a "primarily inorganic substrate" means a substrate that has about 90% inorganic component such as silica. The remaining portion of the substrate can have organic materials, or in some cases, trace impurities, or both. As used in the specification and claims, the singular form "a", "an" and "the" include plural references unless the context clearly dictates otherwise. For example, the term "an agent" includes a plurality of agents, including mixtures thereof.

Porous Substrate

The porous substrate is useful as an article of manufacture having a rigid or semi-rigid surface on which polymers can be synthesized and or various applications (such as hybridization, ligand-binding assays) using polymers can be performed. In some aspects, the porous region comprises a primarily inorganic porous material providing an enhanced surface area greater than the flat surface area. In some embodiments, the primarily inorganic porous region comprises silica. In some embodiments, at least one surface of the substrate will be substantially flat, although in some embodiments it may be desirable to physically separate synthesis regions for different polymers with, for example, wells, raised regions, etched trenches, large beads, light transmitting fibers, or the like. According to other embodiments, small beads may be provided on the surface of the substrate itself, which may be released upon completion of the synthesis. The porous region is formed on an support material that can be of a similar or different material than the material of the porous region. Suitable materials include those recited herein as support, such as all types of glass materials, plastics, polymers, fused silica and other rigid and semi-rigid materials.

The porous region may be made of silica or other material or materials. The term "silica" represents silica compounds such as silicon dioxide, although the exact stoichiometric ratio of oxygen to silicon may vary and the silica may include modifying elements. The silica may be in a colloidal form (which is known as colloidal silica) or in a noncolloidal form. Silica can be made from an organic compound or compounds comprising the silicon atom such as an alkoxysilane, an example of which is tetramethoxysilane ("TMOS"). Colloidal silica, which is a form of very fine silica particles, can be suspended in water (commonly called a "sol") or in an organic solvent.

The porous substrate has a porous region wherein a substantial number of the pores of the layer are connected to each other and eventually to the free surface of the substrate. This allows the infusion of the porous layer with a fluid or fluids, such as a gas, a liquid, including liquid solutions, or a fluid polymer, and can provide a substantial increase in surface area (compared to the flat area of the substrate) for molecules to attach to the surface of porous layer, as well as providing surface area for reactions to occur. The porous substrate provides a three-dimensional matrix that can be functionalized with reactive groups, such as silylating agents, that serve as starting points for polymer synthesis. The porous films provide a large number of synthesis sites per unit area of the substrate. Additionally, the porous substrates hold the potential to greatly increase the binding of "target" molecules to immobilized polynucleotide or nucleic acid sequences, which would thereby enhance detection. Additionally, the multiplicity of binding sites may provide additional kinetic enhancement.

FIG. 1 is a simplified cross section of a portion of a porous substrate 100 showing a porous region 102 formed on a support region 104. The support region can be one of several different materials, such as silica, glass, silicon, or other material that forms a suitable mechanical support for the porous region, can withstand processing, and will not significantly effect the intended use of the substrate, such as through chemical reaction with assay or synthesis materials. The porous substrate is made up of a plurality of particles 106, 108, and 110. In this view, the diameters vary because of the nature of taking a cross section, and also because there is typically some distribution of particle size. A free surface ("surface") 112 has opening, or pores 114, that allow the entry of fluids, such as liquids or gas, into the porous layer. In this example the particles are nominally 70 nm across silica particles. This section view represents particles of essentially the same size that intersect the section plane. The various diameters shown in the figure represent sections of particles, some of which are not sectioned through their center. It is understood that, generally, each particle touches several other particles, and thus a silica matrix is formed.

Sodium Borosilicate Porous Silica Substrate

The sodium borosilicate porous silica to be used herein has the composition of about 65–70% $SiO_2$, about 24–27% $B_2O_3$, and about 6–8% $Na_2O$ (by weight). In one embodiment, the composition is 67.4% $SiO_2$, 25.7% $B_2O_3$, and 6.9% $Na_2O$ (by weight). The glass is prepared by a variety of methods, including by a modification of what is commonly known as "the VYCOR™ process". In the VYCOR process, the glass is annealed, causing phases to separate. The soluble phase, which is rich in sodium and boron, is then removed by leaching with hydrochloric or hydrofluoric acid, leaving behind a porous phase that is nearly pure silica. After leaching, a thermal treatment, or anneal, can be used to modify the porous structure. If a silica product is desired, the porous silica glass can then be sintered at high temperatures to full density and extremely high purity. This allows one to fabricate an article out of sodium borosilicate glass, which has a lower softening point and is easier to form than pure silica, and end up with an article that is nearly pure silica. In the present application, the initial porosity is desired. The pore size can be controlled by the time of annealing, while the layer depth can be controlled by the time of leaching with acid.

Figure 2:
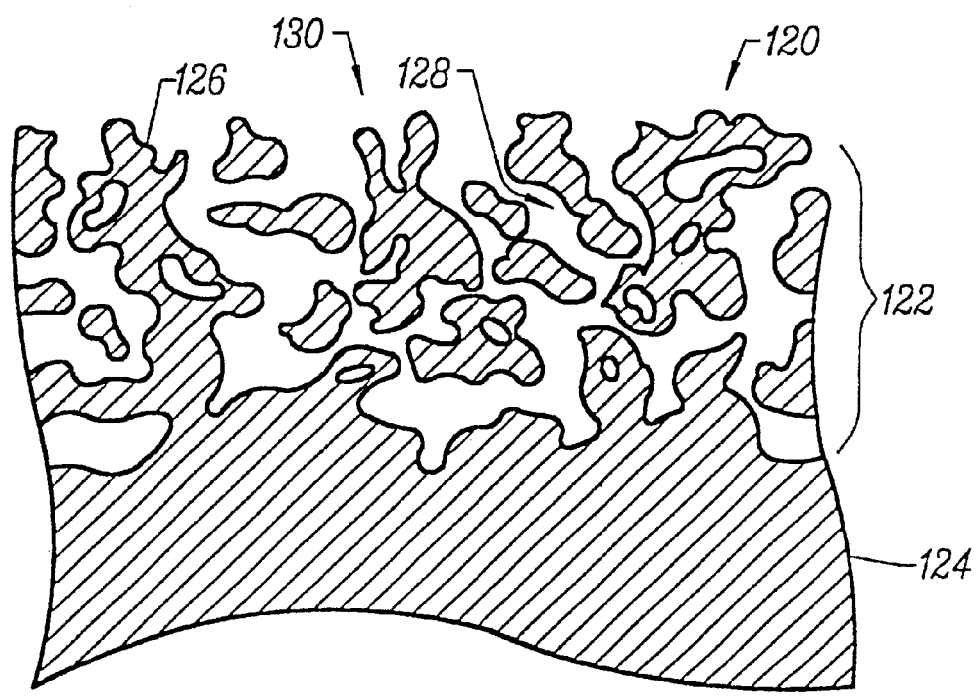
FIG. 2 is a simplified cross section of a portion of a porous substrate with a porous region formed by leaching according to one embodiment of the invention.

FIG. 2 is a simplified cross section of a portion of a porous substrate 120 showing a porous region 122 formed on a support region 124. The support region is generally phase separable glass, but could be other material bonded to the porous region, for example. In one preferred embodiment, the porous region is etched in a phase separable glass that also provides the support region (i.e. the porous substrate is formed from a blank of phase separable glass). The porous region is formed by preferential leaching, as described above, and forms a "sponge-like" or "coral-like" matrix 126 with pores 128 accessible from the surface 130 by fluids. In contrast to the deposited porous region shown in FIG. 1, the leached porous region has a less-defined transition between the porous region 122 and the support region. It is understood that the figures are not to scale and are not scaled relative to each other.

Sol-Gel Type Porous Silica Substrate

The sol-gel method can use colloidal silica with, or without an alkoxysilane. A preferred embodiment uses a tetraalkoxysilane, for example, $Si(OCH_3)_4$ as a starting material, which is mixed and stirred with $CH_3OH$ and $H_2O$. The resulting mixture is transferred into a desired vessel. The vessel is allowed to stand to subject the mixture to hydrolysis and condensation reactions.

Illustrative of tetraalkoxysilanes and other metal and metalloid alkoxides that can be used in this invention are methoxy and ethoxy derivatives of silicon, lithium, sodium, potassium, rubidium, cesium, magnesium, calcium, strontium, barium, titanium, zirconium, vanadium, tantalum, chromium, molybdenum, tungsten, manganese, iron, nickel, cobalt, copper, zinc, cadmium, boron, aluminum, phosphorus, gallium, germanium, tin, arsenic, antimony, bismuth, selenium, and the like. Aryloxy derivatives such as trimethoxyphenoxysilane also can be utilized in the sol-gel process.

Illustrative of water-miscible solvents which can be employed in a sol-gel process embodiment are alcohols such as methanol and ethanol; ketones such as acetone and methyl ethyl ketone; esters such as methyl acetate and ethyl formate; ethers such as dibutyl ether and tetrahydrofuran; amides such as formamide, dimethylformamide, dimethylacetamide and 1-methyl-2-pyrrolidinone; and the like.

Acidic pH conditions in the sol-gel process can be provided by the addition of mineral acids such as hydrochloric acid, and basic pH conditions can be provided by the addition of bases such as ammonium hydroxide. Hydrogen fluoride is a particularly preferred acidic pH reagent, because the fluoride anions have a catalytic effect on the hydrolysis and condensation reactions of the sol-gel process.

Characteristics of the Porous Silica Substrate

In one embodiment, the porous region has the following preferred characteristics: a pore size of 2–500 nm, e.g., 2–100 nm, 2–200 nm, or 2–50 nm; a porosity of 10–90%, e.g., 10–30%, 20–80%, 40–60%, 70–90%, or 50–70%; an thickness of 0.01–20 $\mu$m, 0.1–0.5 $\mu$m, 0.1–1.0 $\mu$m, or 1–20 $\mu$m. When the substrate is prepared from a colloidal silica deposition, the average particle diameter is in one embodiment 5–500 nm, 5–100 nm, or 70–100 nm. It is well-known in the art how to measure and determine the above characteristics of porosity, pore size, thickness and particle diameter. Additionally, the substrate can be made of an alkoxysilane, or colloidal silicon dioxide or both in varying concentrations. It is also known in the art that some tolerance for trace impurities is allowed. The alkoxysilanes include trialkoxysilanes and tetraalkoxysilanes.

Functionalization/Silylation

The porous silica substrate of the present invention can be silylated to provide many functionalized attachments. Alternatively, the colloidal silica particles, which are used in preparing the porous silica substrate, can be functionalized so that the porous silica substrate that is formed is already functionalized. The silylation can be accomplished by using any number of silylating agents. Many silylating agents are known in the art. For example, N-(3-(triethoxysilyl)-propyl)-4-hydroxybutyramide (PCR Inc., Gainesville, Fla.) has been used to silylate a glass substrate prior to photochemical synthesis of arrays of polynucleotides on the substrate, as described in McGall et al., *J. Am. Chem. Soc.*, 119:5081–5090 (1997), the disclosure of which is incorporated herein by reference.

Hydroxyalkylsilyl compounds that have been used to prepare hydroxyalkylated substances, such as glass substrates. N,N-bis(hydroxyethyl) aminopropyl-triethoxysilane has been used to treat glass substrates to permit the synthesis of high-density polynucleotide arrays. See McGall et al., *Proc. Natl. Acad. Sci.*, 93:13555–13560 (1996); and Pease et al., *Proc. Nail. Acad. Sci.*, 91:5022–5026 (1994), the disclosures of which are incorporated herein. Acetoxypropyltriethoxysilane and 3-Glycidoxy propyltrimethoxysilane have been used to treat glass substrates to provide a linker for the synthesis of polynucleotides. See EP Patent Application No. 89 120696.3.

The functionalized silicon compounds include an activated silicon group and a derivatizable functional group. Exemplary derivatizable functional groups include hydroxyl, amino, carboxyl and thiol, as well as modified forms thereof, such as activated or protected forms. The functionalized silicon compounds may be covalently attached to surfaces to form functionalized surfaces that may be used in a wide range of different applications. The silicon compounds are attached to the surface of a substrate comprising silica, such as a glass substrate, to provide a functionalized surface on the silica containing substrate, to which molecules, including polypeptides and nucleic acids, may be attached. After covalent attachment of a functionalized silicon compound to the surface of a solid silica substrate to form a functionalized coating on the substrate, an array of nucleic acids may be covalently attached to the substrate or synthesized off of the functional groups. Thus, the method permits the formation of high density arrays of nucleic acids immobilized on a substrate, which may be used in conducting high volume nucleic acid hybridization assays.

As used herein, the term "silicon compound" refers to a compound comprising a silicon atom. In a preferred embodiment, the silicon compound is a silylating agent comprising an activated silicon group, wherein the activated silicon group comprises a silicon atom covalently linked to at least one reactive group, such as an alkoxy or halide, such that the silicon group is capable of reacting with a functional group, for example on a surface of a substrate, to form a covalent bond with the surface. Exemplary activated silicon groups include —Si(OMe)$_3$; —SiMe(OMe)$_2$; —SiMeCl$_2$; SiMe(OEt)$_2$; SiCl$_3$ and —Si(OEt)$_3$.

As used herein, the term "functionalized silicon compound" refers to a silicon compound comprising a silicon atom and a derivatizable functional group. In a preferred embodiment, the functionalized silicon compound has an activated silicon group and a derivatizable functional group. "Derivatizable functional group" refers to a functional group that is capable of reacting to permit the formation of a covalent bond between the silicon compound and another substance, such as a polymer or a polymer building block. Exemplary derivatizable functional groups include hydroxyl, amino, carboxyl and thiol, as well as modified forms thereof, such as activated or protected forms. Derivatizable functional groups also include substitutable leaving groups such as halo or sulfonate. In one preferred embodiment, the derivatizable functional group is a group, such as a hydroxyl group, that is capable of reacting with activated nucleotides to permit nucleic acid synthesis.

The surface can be functionalized by covalently attaching to the surface a functionalized silicon compound, wherein the functionalized silicon compound comprises at least one derivatizable functional group and a plurality of activated silicon groups, for example, 2, 3, 4 or more activated silicon groups. An array of nucleic acids can be covalently attached to the functionalized silicon compounds on the surface. The number of silicon groups and the number of derivatizable functional groups in the silicon compound may be modified for different applications, to increase or decrease the number of bonds to a support such as a glass support.

Further description of several silylating agents and methods for their preparation can be found in U.S. Pat. No. 5,624,711 and in U.S. Ser. No. 09/172,190, filed Oct. 13, 1998, U.S. Pat. No. 6,262,216 which are hereby incorporated by reference. Commercially available silicon compounds and a review of silicon compounds is provided in Arkles, Ed., "Silicon, Germanium, Tin and Lead Compounds, Metal Alkoxides, Diketonates and Carboxylates, A Survey of Properties and Chemistry," Gelest, Inc., Tullytown, Pa. (1995), the disclosure of which is incorporated herein. Functionalized silicon compounds may be synthesized using methods available in the art of organic chemistry, for example, as described in March, *Advanced Organic Chemistry*, John Wiley & Sons, New York (1985).

Polymer Coated Porous Substrate

The porous substrate of the present invention can be polymer-coated. The substrate can be polymer-coated using dip coating, covalent polymer attachment, in situ polymerization, or combinations thereof. In yet another aspect, the substrate can be glycan-coated. While similar to the polymer-coated supports, the properties of glycan-coated supports can be quite different and provide extremely hydrophilic surfaces that are useful in binding assays and diagnostic applications. A detailed description of polymer and glycan coating materials and methods is given in the U.S. Pat. No. 5,624,711, which is hereby incorporated by reference.

In any of these methods, the choice of available surface polymers is extensive. Suitable polymers include chloromethylated styrene-divinylbenzene (Merrifield resin), phenylacetamidomethylated styrene-divinylbenzene (PAM resin), and crosslinked polyethylene glycol-polystyrene grafts (TentaGel resin). The polymers which are used to coat the solid support can also be selected based upon their functional groups which will serve as synthesis initiation sites. Typically, polymers having primary amine, carboxyl or hydroxyl functional groups will be selected.

Polymers having primary amine functional groups are of interest as these polymers can be readily adapted to coupling chemistry currently used in the high density array synthesis. Suitable polymers having primary amine functional groups include polyethyleneimine linear or branched polymers, polyacrylamide, and polyallylamine which are all commercially available. Other polymers, such as polydimethylacrylamide (or other polymers in- this genus), can be synthesized according to published procedures (see Atherton, E. et al. in "Solid Phase Peptide Synthesis: A Practical Approach," Chapter 4, pp. 39–45, IRL Press (1989); and Arshady, R. et al., *J. Chem. Soc. Perkin. Trans.* 1:529 (1981)).

Polymers having carboxyl functional groups are also useful as the resulting surfaces are very hydrophilic. Furthermore, the synthesis initiation sites (i.e. the carboxylic acid groups) are useful in peptide synthesis which proceeds from the amino terminus of the peptide to the carboxylic acid terminus. Suitable polymers having carboxylic acid functional groups include poly(acrylic acid), poly(ethylene/maleic anhydride), and poly(methylvinyl ether/maleic anhydride).

Polymers having hydroxyl functional groups are also useful as the resulting surfaces are extremely wettable. Examples of suitable polymers include polyethyleneglycol (PEG), polyvinyl alcohol and carbohydrates.

In general, the glycan-coated surfaces can be prepared in a manner analogous to the preparation of polymer-coated surfaces using covalent attachment. Thus, a glass surface can be modified (silanized) with reagents such as aminopropyltriethoxysilane to provide a glass surface having attached functional groups (in this case, aminopropyl groups). The modified surface is then treated with a solution of a modified dextran to provide a surface having a layer of dextran which is covalently attached.

Linking Molecules

After derivatization of the porous substrate, the derivatized surface may be contacted with a mixture of linking molecules and diluent molecules (the diluent molecules are optional and are not included in preferred embodiments). The diluent molecules for example have only one center which is reactive with the reactive sites on the derivatized substrate surface. All the other reactive centers on the diluent molecules are protected, capped or otherwise rendered inert. The linking molecules will similarly have one center which is reactive with the reactive sites on the derivatized substrate surface. Additionally, the linking molecules will have a functional group which is optionally protected and which can later serve as a synthesis initiation site. The linking and diluent molecules are present in the mixture in a ratio which is selected to control the functional site density on the surface. The ratio of linking molecules to diluent molecules is for example from about 1:2 to about 1:200, e.g., from about 1:10 to about 1:50. Alternatively, the ratio of linking molecules to diluent molecules can be from about 200:1, or from about 100:1, or from about 10:1, as desired for adjusting the density of polymers on the surface.

The linking molecules should be of sufficient length to permit polymers synthesized thereon to interact freely with molecules exposed to the polymers. The linking molecules should be 3–50 atoms long to provide sufficient exposure of ligands to their receptors. Typically, the linking molecules will be aryl acetylene, ethylene glycol oligomers containing 2–14 monomer units, diamines, diacids, amino acids, peptides, or combinations thereof. In some embodiments, the linking molecule can be a nucleotide or a polynucleotide. The particular linking molecule used can be selected based upon its hydrophilic/hydrophobic properties to improve presentation of the polymer synthesized thereon to certain receptors, proteins or drugs.

The linking molecules can be attached to the substrate by siloxane bonds (using, for example, glass or silicon oxide surfaces). Siloxane bonds with the surface of the substrate may be formed in one embodiment via reactions of linking molecules bearing traditional aminopropyl silane groups such as trichlorosilyl, trimethoxy or triethoxy silyl groups. The linking molecules may optionally be attached in an ordered array, i.e., as parts of the head groups. In some aspects, the linking molecules are absorbed to the surface of the substrate. In addition, linking molecules may also be present in case of nucleic acid synthesis and hybridization assays.

As noted above, the linking molecule, prior to attachment to the derivatized surface has an appropriate functional group at each end, one group appropriate for attachment to the reactive sites on a derivatized surface and the other group appropriate as a synthesis initiation site. For example, groups appropriate for attachment to the derivatized surface would include amino, hydroxy, thiol, carboxylic acid, ester, amide, isocyanate and isothiocyanate. Additionally, for subsequent use in synthesis of polymer arrays or libraries, the linking molecules used herein will typically have a protecting group attached to the functional group on the distal or terminal end of the linking molecule (opposite the solid support).

The linking molecule contributes to the net hydrophobic or hydrophilic nature of the surface. For example, when the linking molecules comprise a hydrocarbon chain, such as $-(CH_2)_n-$, the effect is to decrease wettability. Linking molecules like polyoxyethylene ($-(CH_2CH_2O_n)-$, or polyamide ($-(CH_2CONH)_n-$) chains tend to make the surface more hydrophilic (i.e., increase wettability).

The diluent molecules can be any of a variety of molecules which can react with the reactive sites present on the derivatized substrate and which generally have remaining functional groups capped or protected. The diluent molecules can also be selected to impart hydrophobic or hydrophilic properties to the substrate surface. For example, the diluent molecules are alkanoic acids, which impart hydrophobic properties to the surface. In other cases, the diluent molecules are amino acids, wherein the amine and any side chain functionality which is present are protected. In these instances, the diluent molecules can contain functionality which is altered upon treatment with various reagents such as acid, base or light, to generate a surface having other desired properties. For example, use of O-t-Butyl serine as a diluent molecule provides a hydrophobic surface during polymer synthesis, but upon treatment with acid (cleaving the t-butyl ether), a more hydrophilic surface is produced for assays.

Thus, after reacting the mixture of linking molecules and diluent molecules with the surface and subsequently synthesizing a desired polymer onto the functional sites on the linking group, the protecting groups on the surface-attached diluent molecules are removed to provide a more hydrophilic (i.e. "wettable") surface. In preferred embodiments, the diluent molecules are protected glycine, protected serine, glutamic acid or protected lysine. Dimethyl N,N-diiosopropylphosphoramidite can be used to phosphorylate surface hydroxyls, to alter the surface characteristics. Further description of linking molecules and diluent molecules are given in the U.S. Pat. No. 5,624,711, which is hereby incorporated by reference.

Substrates with Acidic Surfaces

The present invention also provides porous substrates which are derivatized to provide acidic surfaces, or "carboxy chips." The carboxy chips can be considered as "reverse polarity" surfaces (as compared with the more typical aminopropylsilane derivatized surfaces). Such reverse polarity surfaces will find application in combinatorial synthesis strategies which require a carboxylic acid initiation site. For example, peptide synthesis which is carried out from the N-terminal end to the C-terminal end can be carried out on a carboxy chip. Additionally, small molecules such as prostaglandins, β-turn mimetics and benzodiazepines can also be synthesized on a carboxy chip. Carboxy chips will also find application in the preparation of chips having synthesis initiation sites which are amines. In this aspect, the carboxy chips will be reacted with a suitably protected alkylenediamine to generate an amino surface.

Carboxy chips can be prepared by a variety of methods. For example, a solid support is derivatized with an aminoalkylsilane to provide a surface of attached amino groups. The derivatized surface is then treated with an anhydride such as glutaric anhydride to acylate the amino group and provide a surface of carboxylic acid functionalities. Alternatively, the aminoalkylsilane is first reacted with an anhydride (i.e., glutaric anhydride) to generate a carboxylic acid silane which can then be coupled to the porous substrate, and similarly provide a surface of carboxylic acid residues. Further description of carboxy chips can be found in the U.S. Pat. No. 5,624,711, which is hereby incorporated by reference.

Array Synthesis

Large scale chemical diversity on primarily inorganic porous substrates can be achieved by synthetic strategies and devices presented herein. The preferred substrates, solid-phase chemistry, photolabile protecting groups, deprotection techniques, and photolithography, when brought together, achieve very high density, spatially-addressable, parallel chemical synthesis. Thus, the preferred substrates provided herein can be used in a number of applications, including light-directed methods, flow channel and spotting methods, pin-based methods and bead-based methods (see the patents and references cited above).

Alternatively, the primarily inorganic porous substrates of the present invention can be used to prepare high density arrays of polymers using conventional linkage chemistry-based synthetic methods, also known as phosphoramidite-based synthesis methods. One example of conventional linkage chemistry-based polynucleotide synthesis is known as standard dimethoxytrityl (DMT) method. Examples of this and additional phosphoramidite synthesis methods are described in the "User Manual for Applied Biosystems Model 391," pp. 6-1 to 6-24, available from Applied Biosystems, 850 Lincoln Center Dr., Foster City, Calif. 94404, and are generally known by those skilled in the art. See also M. Gait, Oligonucleotide Synthesis: A Practical Approach, 1984, IRL Press, London.

Light-Directed Methods

"Light-directed" methods (which are one technique in a family of methods known as VLSIPS™ methods) are described in U.S. Pat. No. 5,143,854, '305, '934 and other patents above all of which are incorporated by reference. The light directed methods discussed in these patents involve activating known locations or predefined regions of a substrate or solid support and then contacting the substrate with a preselected solution of monomers or polymers. The known locations or predefined regions can be activated with a light source, typically shown through a mask (much in the manner of photolithography techniques used in integrated circuit fabrication). Other regions of the substrate remain inactive because they are blocked by the mask from illumination and remain chemically protected. Thus, a light pattern defines which regions of the substrate react with a given monomer. By repeatedly activating different sets of predefined regions and contacting different monomer solutions with the substrate, a diverse array of polymers is produced on the substrate. Of course, other steps such as washing unreacted monomer solution from the substrate can be used as necessary.

The porous silica substrate and the optionally provided linker molecules thereon can be the same as described infra in the context of conventional linkage chemistry-based synthesis. The linker molecules may each include a protecting group. In light-directed polymer synthesis, the protecting group is a photocleavable (photoreactive) protecting group. Photocleavable protecting groups, addition, binary synthesis strategy, and other processes associated with light directed methods are shown in U.S. Pat. No. 5,744,305.

Flow Channel or Spotting Methods

Additional methods applicable to library synthesis on a single substrate are described in U.S. Pat. Nos. 5,677,195, 5,384,261, and 6,040,138 incorporated herein by reference for all purposes. In the methods disclosed in these applications, reagents are delivered to the substrate by either (1) flowing within a channel defined on predefined regions or (2) "spotting" on predefined regions. However, other approaches, as well as combinations of spotting and flowing, may be employed. In each instance, certain activated regions of the substrate are mechanically separated from other regions when the monomer solutions are delivered to the various reaction sites. One of ordinary skill in the art would also appreciate that this method can also be used to deposit pre-synthesized oligomers or polymers for further polymerization.

The "spotting" methods of preparing arrays of the present invention can be implemented in much the same manner as the flow channel methods. For example, a monomer A can be delivered to and coupled with a first group of reaction regions which have been appropriately activated. Thereafter, a monomer B can be delivered to and reacted with a second group of activated reaction regions. Unlike the flow channel embodiments described above, reactants are delivered by directly depositing (rather than flowing) relatively small quantities of them in selected regions. In some steps, of course, the entire substrate surface can be sprayed or otherwise coated with a solution. In preferred embodiments, a dispenser moves from region to region, depositing only as much monomer as necessary at each stop. Typical dispensers include a micropipette, a quill, or a pin and ring to deliver the polymer solution to the substrate and a robotic system to control the position of the micropipette with respect to the substrate, or an inkjet printer. In other embodiments, the dispenser includes a series of tubes, a manifold, an array of pipettes, or the like so that various reagents can be delivered to the reaction regions simultaneously.

Pin-Based Methods

Another method which is useful for the preparation of compounds and libraries of the present invention involves "pin based synthesis." This method is described in detail in U.S. Pat. No. 5,288,514, previously incorporated herein by reference. The method utilizes a substrate having a plurality of pins or other extensions. The pins are each inserted simultaneously into individual reagent containers in a tray. In a common embodiment, an array of 96 pins/containers is utilized.

Each tray is filled with a particular reagent for coupling in a particular chemical reaction on an individual pin. Accordingly, the trays will often contain different reagents. Since the chemistry disclosed herein has been established such that a relatively similar set of reaction conditions may be utilized to perform each of the reactions, it becomes possible to conduct multiple chemical coupling steps simultaneously. In the first step of the process the invention provides for the use of substrate(s) on which the chemical coupling steps are conducted. The substrate is optionally provided with a spacer having active sites. In the particular case of polynucleotides, for example, the spacer may be selected from a wide variety of molecules which can be used in organic environments associated with synthesis as well as aqueous environments associated with binding studies. Examples of suitable spacers are polyethyleneglycols, dicarboxylic acids, polyamines and alkylenes, substituted with, for example, methoxy and ethoxy groups.

Additionally, the spacers will have an active site on the distal end. The active sites are optionally protected initially by protecting groups. Among a wide variety of protecting groups which are useful are FMOC, BOC, t-butyl esters, t-butyl ethers, and the like. Various exemplary protecting groups are described in, for example, Atherton et al., "Solid Phase Peptide Synthesis," IRL Press (1989), incorporated herein by reference. In some embodiments, the spacer may provide for a cleavable function by way of, for example, exposure to acid or base.

Bead Based Methods

A general approach for bead based synthesis is described in U.S. Pat. Nos. 5,770,358, 5,639,603, and 5,541,061 the disclosures of which are incorporated herein by reference. For the synthesis of molecules such as polynucleotides on beads, a large plurality of beads are suspended in a suitable carrier (such as water) in a container. The beads are provided with optional spacer molecules having an active site. The active site is protected by an optional protecting group.

In a preferred embodiment, the beads are tagged with an identifying tag which is unique to the particular double-stranded polynucleotide or probe which is present on each bead. A complete description of identifier tags for use in synthetic libraries is provided in U.S. Pat. No. 5,639,603.

Conventional Linkage Chemistry Methods

In addition to the above-described light-directed methodology, high density arrays of polymers can be synthesized using conventional linkage-based chemistry and using protecting groups that are chemically cleaved using solution or vapor-phase deprotection agents. This methodology is described in greater detail in the U.S. Pat. No. 5,599,695, which is incorporated by reference.

The above methodology can be applied to the synthesis of several types of polymer, including those of biological interest such as polynucleotides, nucleic acids, polypeptides, proteins, oligosaccharides and polysaccharides. Chemical synthesis of polypeptides is known in the art and are described further in Merrifield, J., *J. Am. Chem. Soc.*, 91:501 (1969); Chaiken I. M., *CRC Crit. Rev. Biochem.*, 11:255 (1981); Kaiser et al., *Science*, 243:187 (1989); Merrifield, B., *Science*, 232:342 (1986); Kent, *Ann. Rev. Biochem.*, 57:957 (1988); and Offord, R. E., *Semisynthetic Proteins*, Wiley Publishing (1980), which are incorporated herein by reference). In addition, methods for chemical synthesis of peptide, polycarbamate, and polynucleotide arrays have been reported (see Fodor et al., *Science*, 251:767–773 (1991); Cho et al., *Science*, 261:1303–1305 (1993), each of which is incorporated herein by reference).

Data Collection

Devices to detect regions of a substrate which contain fluorescent markers are known in the art. See e.g., U.S. Pat. Nos. 5,631,734; 5,744,305; 5,981,956 and 6,025,601, incorporated by reference. These devices would be used, for example, to detect the presence or absence of a labeled receptor such as an antibody which has bound to a synthesized polymer on a substrate.

U.S. Pat. No. 5,527,681, the disclosure of which is incorporated herein, describes use of computer tools for forming arrays. For example, a computer system may be used to select nucleic acid or other polymer probes on the substrate, and design the layout of the array as described in U.S. Pat. No. 5,571,639, the disclosure of which is incorporated herein.

Further understanding of the nature and advantages of the inventions herein may be realized by reference to the remaining portions of the specification and the attached drawings.

All publications cited herein are incorporated herein by reference in their entirety.

APPLICATIONS

The above-described arrays of polymers such as polypeptides, or nucleic acids or polysaccharides prepared on the porous substrates of this invention can be used in a variety of applications including biological binding assays and nucleic acid hybridization assays. For example, polynucleotide or nucleic acid arrays can be used to detect specific nucleic acid sequences in a target nucleic acid. See, e.g., PCT patent publication Nos. WO 89/10977 and 89/11548. General hybridization and detection of nucleic acids is shown in U.S. Pat. Nos. 5,631,734, 5,510,270 and 5,324,633.

Methods for screening target molecules for specific binding to arrays of polymers, such as nucleic acids, immobilized on a solid substrate, are disclosed, for example, in U.S. Pat. Nos. 5,677,195, 5,631,734, 5,624,711, 5,599,695, 5,510,270, 5,445,934, 5,451,683, 5,424,186, 5,412,087, 5,405,783, 5,384,261, 5,252,743 and 5,143,854; 5,800,992, 5,795,716, 6,040,138 and U.S. application Ser. No. 08/388, 321, filed Feb. 14, 1995 now U.S. Pat. No. 5,766,101. Accessing genetic information using high density DNA arrays is further described in Chee, *Science* 274:610–614 (1996). Arrays to detect mutations in the p53 gene are described in the U.S. Pat. No. 5,837,832, which is incorporated by reference. Arrays to detect mutations in HIV genes are described in detail in the U.S. Pat. No. 5,861,242. Arrays to detect nucleic acid from nonviral pathogens infecting AIDS patients are shown in U.S. Pat. No. 5,861,242. Devices for concurrently processing multiple biological chip assays may be used as described in U.S. Pat. No. 5,545,531. The arrays of polynucleotides or nucleic acids prepared on porous silica substrates provided herein can be used to screen polymorphisms in samples of genomic material. The detailed methodology is provided in the U.S. Pat. No. 5,858,659. Tiling strategies are discussed in detail in the U.S. Pat. No. 5,837,832. Hybridization and scanning are generally carried out by methods described in, e.g., Published PCT Application Nos. WO 92/10092 and WO 95/11995, and U.S. Pat. No. 5,424,186, incorporated herein by reference. Gene expression may be monitored by hybridization of large numbers of mRNAs in parallel using high density arrays of nucleic acids in cells, such as in microorganisms such as yeast, as described in Lockhart et al., *Nature Biotechnology*, 14:1675–1680 (1996), and U.S. Pat. Nos. 5,800,992 and 6,040,138, PCT WO 97/10365. Bacterial transcript imaging by hybridization of total RNA to nucleic acid arrays may be conducted as described in Saizieu et al., *Nature Biotechnology*, 16:45–48 (1998), the disclosure of which is incorporated herein. Additional examples of applications in biomedical and genetic research and clinical diagnostics are disclosed in U.S. Pat. Nos. 5,547,839, 5,710, 000 (using Type-IIs restriction endonucleases), and in U.S. patent application Ser. No. 08/143,312, filed on Oct. 26, 1993, now abandoned. Other applications include chip based genotyping, species identification and phenotypic characterization, as described in U.S. patent application Ser. No. 08/797,812, filed Feb. 7, 1997, now U.S. Pat. No. 6,228,575 and U.S. application Ser. No. 08/629,031, filed Apr. 8, 1996, now abandoned.

Arrays of nucleic acids for use in gene expression monitoring are described in PCT WO 97/10365, the disclosure of which is incorporated herein. In one embodiment, arrays of nucleic acid probes or other polymer probes are immobilized on a surface, wherein the array comprises more than 100 different nucleic acids and wherein each different nucleic acid is localized in a predetermined area of the surface, and the density of the different nucleic acids is greater than about 60 different nucleic acids per 1 $cm^2$.

Arrays of nucleic acids or other polymers immobilized on a surface also are described in detail in U.S. Pat. No. 5,744,305, the disclosure of which is incorporated herein. As disclosed therein, on a substrate, nucleic acids or other polymers with different sequences can be immobilized each in a predefined area on a surface. For example, 10, 50, 60, 100, $10^3$, $10^4$, $10^5$, $10^6$, $10^7$, or $10^8$ different monomer sequences may be provided on the substrate. The nucleic acids of a particular sequence are provided within a predefined region of a substrate, having a surface area, for example, of about 1 $cm^2$ to $10^{-10}$ $cm^2$. In some embodiments, the regions have areas of less than about $10^{-1}$, $10^{-2}$, $10^{-3}$, $10^{-4}$, $10^{-5}$, $10^{-6}$, $10^{-7}$, $10^{-8}$, $10^{-9}$, or $10^{-10}$ $cm^2$. For example, in one embodiment, there is provided a planar, non-porous support having at least a first surface, and a plurality of different nucleic acids attached to the first surface at a density exceeding about 400 different nucleic acids/$cm^2$, wherein each of the different nucleic acids is attached to the surface of the solid support in a different predefined region, has a different determinable sequence, and is, for example, at least 4 nucleotides in length. The nucleic acids may be, for example, about 4 to 20 nucleotides in length. The number of different nucleic acids may be, for example, 1000 or more.

Since the application of a porous glass is considerably broader than its use in the examples discussed and provided herein, these examples are used for illustrative purposes only and should not be construed as a limitation on the full scope of the invention disclosed herein.

EXAMPLES

Example 1

Sol-Gel Silica Deposition

Methods and Materials

Glass microscope slides (2 in×3 in×0.027 in, from ERIE SCIENTIFIC) were cleaned in piranha solution (30% v/v hydrogen peroxide, 70% v/v sulfuric acid) for 30 minutes with gentle stirring. They were then transferred immediately to clean water in which they were stored. The slides were removed and blown dry with dry nitrogen immediately prior to film deposition. Long-term storage in water is not necessary for depositing films.

The starting point for the film preparation is to mix the precursors in solution. Colloidal silica, tetramethoxysilane (TMOS), hydrochloric acid, water, and methanol are mixed in solution. The particle size of the colloidal silica ranged from about 12 nm-to >100 nm and was deposited on a glass surface. In addition to the glass slides discussed above, other exemplary glass providing a surface for the deposition of colloidal silica is soda lime glass (Erie Scientific), as well as borofloat glass or fused silica glass (U.S. Precision Glass, Elgin, Ill.). The resultant pores from such particles are in the 2–40 nm range. Layers having a thickness of about 0.1 $\mu$m-2 $\mu$m were investigated, but the thickness was chosen for experimental purposes and actual devices may have thicker or thinner layers. TMOS may be added to the colloidal silica to strengthen the resulting silica matrix.

Two sources of colloidal silica were used. LUDOX™ was purchased from E.I. Dupont de Nemoirs, and includes silica spheres suspended in water, stabilized by sodium counterions. For HS-40, the spheres are nominally 12 nm diameter, whereas for TM-40 they are 22 nm. SNOWTEX™ colloidal silica was purchased in from NISSAN CHEMICALS in three sizes (listed size range in parenthesis): SNOWTEX-50 (20–30 nm), SNOWTEX-20L (40–50 nm), and SNOWTEX-ZL (70–100 nm).

Tetramethoxysilane was purchased from ALDRICH, with specification of 98% purity. The pH of the total mixture was adjusted to 3.75+/−0.25, measured with a VWR benchtop pH meter Model 8015™ (VWR SCIENTIFIC).

Formation of Films

Equal weights of colloidal silica were used in each solution, and then water was added as necessary to keep the solution volume constant. Table 1 shows the compositions that were used. 1.2M HCl was used to titrate the solutions to the appropriate pH, with different amounts being required in each case. It should be noted that the glass composition listed in the Table below may also have trace amounts of impurities.

TABLE 1

Representative Colloidal Silica Solution Compositions (amounts in mL)

| Size (nominal) | 12 nm (Ludox HS-40) | 22 nm (Ludox TM-40) | 20–30 nm (Snowtex-50) | 40–50 nm (Snowtex-20L) | 70–100 nm (Snowtex-ZL) |
| --- | --- | --- | --- | --- | --- |
| Brand | | | | | |
| Water | 13.4 | 13.4 | 14.9 | 5.2 | 13.4 |
| Methanol | 12.6 | 12.6 | 12.6 | 12.6 | 12.6 |
| Colloidal Silica | 6.6 | 6.6 | 5.2 | 14.8 | 6.6 |
| TMOS | 1.36 | 1.36 | 1.36 | 1.36 | 1.36 |

The components were mixed in solution and stirred gently for approximately 10 minutes. Stirring was discontinued, and the mixture was left to react for approximately one hour. The solution was then filtered with a 0.45 micron filter (either with a filter attached to the syringe or by filtering the solution separately and then dispensing). Films were also created without the use of TMOS in the precursors. For those films, using the SNOWTEX-20L and ZL, the solution was typically diluted to 10–20 wt. % with pure water, and then filtered with a syringe filter (or HPLC-grade nylon 0.45u filter paper for large batches). These cases will be noted in later sections. Prior to deposition, dynamic light scattering was performed on the solutions. Light scattering analysis gives the size distribution of the particles in solution.

The substrate was then spun at various speeds, ranging from 500 to 2500 rpm on a Headway Research photo-resist spin coater (Headway Research) to distribute the solution into a thin film. For the data reported, the films were deposited in a lab environment with no explicit control of air flow, temperature, or humidity.

The substrates were then allowed to dry at room temperature conditions for several hours. They were then transferred to an oven were they were fired at 75° C. for one hour, 100° C. for 2 hours, and then 500° C. for 5 hours. The first two steps are to remove residual moisture, the last to cause mild sintering of the matrix for mechanical stability. Some films were also created without the use of this procedure, and will be noted in later sections. In a preferred embodiment, no sintering (annealing) step is performed. Such a porous layer also has improved effective surface area because sintering or similar high-temperature processing generally causes particles to at least partially combine or densify. It has been found that the un-sintered colloidal silica layers are sufficiently robust for a variety of intended uses, such as polymer synthesis or bioassay.

Thickness of the films was measured by scratching the films and then measuring the depth of scratch with a surface profilometer, such as a DEKTAK II™ available from VEECO. Surfaces for ellipsometric measurements were made by depositing the films on silicon rather than glass to provide a contrast in the index of refraction. The silicon dioxide surface layer on the silicon substrate should provide a substrate similar to the glass surface. Ellipsometric measurements were made with a Gaertner Ellipsometer Model L116C™ with a light wavelength of 632.8 nm (Gaertner Scientific Corporation).

A desirable feature of the porous layers of the present invention formed on the surface of the underlying substrate is that they do not appreciably scatter light, such as may be used in scanning arrays of polymer or genetic materials. In some prior art processes, relatively large holes have been etched into the surface of a substrate, such as a glass substrate. Such large holes are distinguishable from the pores of the present invention in that a process mask or similar method is typically used to define the location of the holes. Furthermore, such holes can be large enough to scatter light and interfere with scanning or other light-based use of the substrate.

After the porous surfaces were prepared they needed to be silanated to appropriately prepare the surface for oligomer synthesis. Prior to silanation, the dried and annealed slides were soaked in water for approximately 15 minutes. They were then transferred to a bath of reagent alcohol for 3 minutes, and then to the silane bath for 15 minutes. The silane bath consists of 94% reagent alcohol, 5% water, and 1% bis (2hydroxyethyl)-3-aminopropyltriethoxysilane in 62% ethanol (Gelest Inc.) by volume. Slides were then transferred to two successive isopropanol baths (5 minutes each), blown dry with dry nitrogen, and placed in a 35–50° C. oven for 3 minutes. The above silanation conditions were used for most applications. However other silanes and silylation conditions were also used.

Fluoreprime Stain Assay: Qualitative/Quantitative Surface Performance using Photochemical Polynucleotide Synthesis Quantitative studies of the synthesis, density and uniformity of the porous silica substrates was conducted using methods based on surface fluorescence as described in McGall et al; *J. Am. Chem. Soc.*, 119:5081–5090 (1997). Fluorescent "staining" of the surface was performed as described, with the exception that a fluorescein concentration of 0.5 mM in a solution containing 50 mM DMT-T-CEP in acetonitrile was used. The fluorescein phosphoramidite is coupled to the free hydroxyl groups with the standard protocol. Substrates are then deprotected for a minimum of one hour in a 1:1 solution of ethylenediamine/ethanol, rinsed with deionized water, and blown dry with dry nitrogen. The substrate is then scanned. using a confocal microscopy. The signal obtained is a function of the number of available hydroxyl groups on the surface. In this case, the relative values as compared to other types of similarly treated glass is an indication of the relative density and capacity of the surface. This technique also provides a visual picture of the surface with respect to quality and unformity of the surface. The technique is not limited to hydroxyl groups but may be modified to measure other groups of interest for support of polymer of interest on the surface by using the appropriately functionalized molecule for detection.

HPLC Quantitation Assay

This technique is described in U.S. Pat. No. 5,843,655, "Methods for Testing Oligonucleotide Arrays," also by Affymetrix. HPLC (high performance liquid chromatography) analyses were performed on a Beckman System Gold ion exchange column using fluorescence detection at 520 nm. Elution is performed with a linear gradient of 0.4M $NaClO_4$ in 20 mM Tris pH 8, at a flow rate of 1 mL/min, or other suitable buffer system.

The HPLC quantitation assay was used to measure the site density available for generating polymers, the coupling efficiency of each subsequent addition of monomer to the growing chain, and the extent of adsorption or entrapment of the reagents within the porous matrix.

In this technique, MeNPOC PEG is attached to the surface, followed by a capping step, a cleavable ($SO_2$) linker, a spacer molecule ("C3," a three carbon chain), and a fluorophore. The linker is 5'-phosphate-ON reagent (ChemGenes Corporation), and the fluorophore is 5-carboxyfluorescein-CX CED phosphoramidite (Flam) (BioGenex). The purpose of the spacer molecule is to discriminate between fluorescent molecules that have attached to the intended synthesis sites vs. those that have remained on the surface without chemical attachment. It should be noted that the cleavable linker can be attached directly to the glass surface without the use of a PEG-type linker. Synthesis was also accomplished on the surfaces using traditional acid-based polynucleotide chemistry (trityl chemistry). Similar chemistries can be applied for the synthesis of polynucleotide, peptide, oligosaccharides, peptide nucleic acids, and other polymers. The description relating to the peptide nucleic acids can be found in the PCT publication WO92/20702, published Nov. 26, 1992, which is incorporated by reference in its entirety.

After synthesis the surface is treated with a known solution volume of reagent necessary to cleave the linker to release 3'-$C_3$-flam-5', and this is typically cleaved in solution overnight (1: I by volume ethylenediamine/water). The resulting solution is diluted and coinjected with an internal standard onto and analyzed by HPLC. The internal standard is a 3'-$C_3$-$C_3$-Flam-5' chain prepared separately on an ABI synthesizer. Concentration is determined by UV-V is spectra on a Varian Cary 3E spectrophotometer (Varian). Integration of HPLC peak areas can be used to determine total site density and cleanliness of coupling.

In an analogous experiment step by step coupling yields can be determined by coupling the cleavable linker amidite and Fluorescein amidite to the surface followed by synthesis of a polymer of interest using MeNPOC chemistry. Typically a 6-mer homopolymer such as poly $(A)_6$ is synthesized. The probes are then cleaved in solution, diluted with an appropriate corresponding internal standard, and run through the HPLC column. Peaks are observed for the probes of lengths 1–6, and give indication of the relative coupling yield of successively added bases.

Synthesis of Full-length Probes for Functional Assessment of Porous Surface under Hybridization Conditions Full length probes capable of hybridization, typically 20-mer probes, were synthesized using Affymetrix synthesizers as described in U.S. Pat. No. 5,405,783, using nucleoside phosphoramidites equipped with 5'-photolabile MeN-POC protecting groups. The sequence used for the majority of the preliminary experiments is (3')-AGG TCT TCT GGT CTC CTT TA (5'), with the 3' end attached to the surface. The non-photolabile protecting groups were removed post synthesis in 1:1 ethylenediamine/ethanol (v/v) for a minimum of 4 hours.

Hybridization assays were performed on the 2×3" slides without further processing. Each slide was placed in 10–15 mls of 10–50 nM target oligonucleotide in hybridization buffer with gentle stirring. The two hybridization buffers commonly used are 6×SSPE and MES (sodium chloride, sodium phosphate, EDTA and 2-[N-morpholino] ethanesulfonic acid respectively). The target sequence is the exact complement of the probe sequence: (5') Fluorophore-TCC AGA AGA CCA GAG GAA AT.

The pattern and intensity of surface fluorescence was imaged with a specially constructed scanning laser confocal fluorescence microscope, as described in McGall, supra. Where necessary, the photon multiplier tube gain was adjusted to keep signals within range for the detector.

Results

Initial testing of the porous films was conducted with the smaller particle sizes (Ludox) and including the TMOS and annealing steps. Deposition of the particles on the surface of the substrate has been confirmed by using scanning electron microscopy and atomic force microscopy. For films deposited at 2500, 1500, and 500 rpm with the TM-40 solution, the ratio of the hybridization signal on porous glass to flat glass reaches factors of approximately 5, 7 and 18 times that of flat glass respectively. The ratios are calculated by dividing the hybridization signal from the porous surface (with background subtracted) by the hybridization signal from the flat surface (also with background subtracted). This data shows the actual ability both to synthesize full 20-mer probes and hybridize target DNA to the probes, and thus the actual functional improvement which can be obtained with using these surfaces for DNA arrays. The porous surfaces yield signals many times greater than the flat glass. It has been found that the hybridization signal increases with films spun under decreasing spin speed. This corresponds to deposition of a thicker layers at slower speeds and indicates that fluorescence signal obtained is proportional to film thickness.

Thicker films can also be achieved by depositing multiple layers. A multilayer film was created by depositing a layer at 1500 rpm, allowing the film to dry for approximately 15 minutes, and then repeating the process. The hybridization signal at the 20 and 40 hour time points is approximately 2 times higher for the multilayer film than for the single layer. Film thickness can be modulated by depositing multiple layers or by increasing the weight percent of the colloidal silica in the solution prior to deposition on the glass surface. This again demonstrates the tremendous flexibility of sol-gel deposition and its use for this application.

It should be noted that the sol-gel layers were formed without explicit control of temperature, humidity, or air flow. This demonstrates the robustness of the process. Controlling these variables and other environmental factors to refine the properties of the system is within the capability of one of ordinary skill in the art.

Ellipsometric measurements on the 500 rpm surface gave an index of refraction for the film of approximately 1.3. The refractive index of a porous film is the volume average of the solid phase and the pore space, and thus gives an estimate of the porosity. Using this technique, it is estimated that the above film is approximately 30–40% porous. Film thickness for the 500 rpm film was measured as 6400+/−300 Å. Combining these measurements with the nominal particle size, it is estimated that the porous surface will have a maximum surface area of approximately 100 times that of a flat surface of comparable lateral dimensions. However, this estimate does not take into account factors such as particle contacts and TMOS coverage, so the actual area available is smaller than this multiple.

To analyze how much of the surface is being accessed by probe synthesis, an HPLC quantitation analysis of the surface was performed to determine the site density and this value was compared to the fluorescence signal attained by scanning. For the films spun at 500 rpm with the TM-40 solution, both procedures give signals which agree within experimental error, and indicate that the porous surface has approximately 40 times more sites than a flat surface. Furthermore, since the site density and fluorescence agree, quenching is not significant or an issue when evaluating surfaces of this density.

The HPLC results also showed that there are not a significant number of fluorescent molecules which are not attached to activated synthesis sites, as the only large peaks in the chromatogram were from the activated synthesis sites and the internal standard. This is an important result because molecules getting "stuck" in the matrix could be a concern. Given the 40-fold factor improvement (out of a theoretical 100-fold maximum), it is clear that the films offer substantial advantages over flat glass, and also that there is room for further improvement if even more of the surface can be accessed.

Pore size in these films is estimated as the smallest spaces between particles through which a potential target would have to diffuse. For the current system, this is estimated by assuming three same-sized particles in a triangular formation. In this configuration, the pore size is approximately 0.15 times the particle diameter. Thus for 22 nm particles, the smallest pores would be on the order of 4 nm.

The use of larger particles (and thus larger pores) may be one route to access more of the surface. An additional advantage of depositing films comprised of larger particle sizes, is that there is a potential to use larger target molecules. As will be described in following sections, various staining and antibody amplification techniques are often used for signal amplification in hybridization to complex arrays. These molecules are often much larger than the fluorescein-labeled polynucleotides. For this reason, experiments were conducted with the larger Snowtex particles before proceeding to complex arrays.

Using the same procedures as described previously (TMOS, annealing of substrate), films were deposited at 500 and 2500 rpm with Snowtex-20L (referred to as "40 nm") and Snowtex-ZL (referred to as "70 nm") solutions and hybridized to a target solution (50 nM target, 6XSSPE). These films show significant improvement over the flat glass, especially under stringent assay conditions of long hybridization times at elevated temperature. With these porous surfaces, signal enhancements of 15 to 45 times that of flat glass were reached, with higher signals for smaller particles (higher surface area to volume ratio per particle) and slower spin speeds (thicker films).

Edge diffraction studies revealed that the porous silica surface did not affect light absorbance through the glass substrate or cause light scattering, thus rendering the surface amenable to photochemical methods of synthesis. For photochemical methods to be employed on such surfaces for the printing of small features, the edge resolution must be very sharp. The methodology was as described in McGall, et al, supra. The results indicate that there was no discernible distinction (i.e., diffraction effects) between the flat glass and the porous silica, which was verified down to features sizes of 24×24 microns.

Experiments were conducted to determine if several of the steps of the original procedure, use of the TMOS and annealing steps, could be eliminated. The primary effect of removing these steps could be a resultant decrease in the stability of the films. This film stability was tested in several ways.

Films originating from a 10 wt. % ZL solution were deposited and fluoroprime stained as described above. Flat "standard" glass controls was run as well. The arrays were scanned at intervals and the signal was tracked over the course of several days under harsh assay-type conditions: MES buffer or 6×SSPE buffer at 45° C. In MES buffer, the fluoroprime stain signal intensity on the porous surfaces decreased slightly more slowly than the flat glass. The porous films exhibited similar rates of signal decay when compared to the flat glass in 6×SSPE buffer, The rate signal decrease in the 6×SSPE buffer assay was quicker for both the porous and flat glasses.

To further test stability, a functional hybridization assay was performed under typical "gene expression" conditions of an overnight (16–18 h) hour hybridization at 45° C. Films were deposited with a 10 wt. % ZL solution and a concentrated ZL solution (equivalent to 4–5 layers deposited at 10 wt %), yielding films of approximately 1500 and 6000 angstroms thick respectively. 20 mer probes were synthesized and hybridized to 10 nM labeled target. The films achieved fluorescence hybridization signals of 6 and 29 times that of the flat glass respectively, which shows that the signal increase is approximately linear with film thickness.

These films provide examples for determining surface accessibility in the larger pore films. The thickness, index of refraction, and light scattering (prior to deposition) analysis are combined to estimate the surface area of these films. The thinner films have a surface area approximately 10 times that of flat glass, and the thicker films are approximately 44 times flat glass. These values are within reasonable. tolerances of the observed 6-fold and 29-fold respective increase detected hybridization signals.

Since the films achieve a signal comparable to their expected area, it is expected that chemical coupling is proceeding efficiently. This was tested by the 6-mer coupling method on several films. Flat glass was tested vs. films deposited from 10 wt. % 20L and ZL solutions. Coupling yield is nearly identical to the flat glass on both of the porous substrates.

Kinetics of hybridization can be determined by real time scanning confocal microscopy of the to follow the annealing of the probe sequence to a 5'-fluorescein labeled complementary oligonucleotide target. (Forman, J. E.,Walton, I. D.,Stern, D.,Rava, R. P.,Trulson, M. O", *Thermodynamics of Duplex Formation and Mismatch Discrimination Onphotolithographically Synthesized Oligonucleotide Arrays Acs Symposium Series* 682:206–228,1998) With a 1500 Angstrom porous glass layer of derived from the 70–100 nm particles, hybridization equilibrium at room temperature is typically reached in approximately 2 h. The time to reach equilibrium increased to 3–5 h for a 3000 Angstrom layer as compared to 40–60 minutes for standard flat surface.

The substrates provided herein can be used with any type of array formation pattern. It can be readily appreciated that by varying the experimental conditions such as viscosity, thickness of layers, size of the colloidal particles, aging time and pH of the colloidal mixture, one can control layer thickness, porosity, morphology, and surface chemistry in order to optimize the system. For example, raising the viscosity (such as by adding less water) or lowering the spin speed can increase film thickness. Depositing multiple layers of the same thickness or different layers of varying thickness would also result in porous layers of the desired thickness. Additionally, other properties such as particle size could be varied on different layers. Controlling the environment, such as humidity, partial pressures of other solvents (such as methanol), air flow, temperature can also lead to porous glass of desired pore size and layer thickness.

Since varying the colloid size changes pore size, one can obtain the desired pore size by appropriately formulating the colloidal mixture of proper particle size initially. Colloid aggregation can be controlled by varying the "aging" time and pH before deposition. Other ceramic colloids, such as titania or alumina, which may have different surface chemistry and/or aggregation properties can also be used to prepare colloids of desired composition and size.

Additionally, surface chemistry of the colloidal particles can be controlled for example, by silanating the colloidal particles before deposition, in order to tailor the chemistry of the final film. Optical scattering can be reduced by using refractive index-matched fluids. These fluids reduce optical scattering during patterning and scanning of the chips. Water has a refractive index of 1.33, whereas that of glass is typically 1.45–1.52. An example of an index-matched fluid is an aqueous solution of 64% by weight sucrose which has an index of 1.45, or dioxane with index of 1.42.

The preparation and synthesis of porous glass substrates is amenable to scale up. Preliminary studies were performed on 2×3 slides. Current manufacturing of "real" GeneChip® arrays requires synthesis to be performed on a 5"×5" fused silica wafer and synthesized on an AFFYMETRIX MOS synthesizer. Moving to this scale posed several new challenges for porous surfaces, all which have been met so far.

Preliminary evaluation of wafer uniformity showed no difficulties in scaling up. The wafers can be coated uniformly by spin coating and most tests that were performed in initial evaluations of the porous surfaces were also used to monitor uniformity across the wafer. These tests involve functional assessment of chip performance as a function of location on the wafer.

There are many mechanical and chemical demands during wafer scale synthesis of DNA arrays. A synthesis cycle is comprised of chemical delivery of reagents on the MOS, followed by removal of the wafer then alignment on a photolysis station. Typical GeneChip® array synthesis involves 70–80 such cycles, consuming up to 18 hrs. of processing and handling, followed then by deprotection, dicing the wafer into individual arrays, and packaging into cartridges. Wafers coated with films comprised of colloidal silica particles survived these various steps and showed higher functional performance that flat glass.

The porous silica substrates of the present invention also possess excellent array feature characteristics. Checkerboard patterns that contain 400×400 micron features as well as the 24 micron features present on the Human 6800 arrays exhibited no defects resulting light scattering- or diffraction-related difficulties during either the photolithographic synthesis or scanning microscopy on the experiments as described herein.

Porous inorganic colloidal silica particle size ranging from 12 nm-greater than 100 nm was deposited on a glass surface. The glass surface was made of but limited to either soda lime, borofloat or fused silica glass. The resultant pores from such particles are in the 2–40 nm range. Layers from 0.1 micron or 2 micron were actively investigated. The layers could be thicker or thinner.

The porous silica substrates of the present invention allow the synthesis of high-density 3-dimensional arrays. High-density arrays were prepared on layers of silica particles of approximately 0.25–0.3 microns thickness which are prepared from a 20% (by weight) colloidal silica solution. Two representative complex high-density DNA arrays will be discussed in detail here to exemplify the capabilities of the present porous glass substrates: one representing a sequence analysis (disease management) type array and one representing a gene expression array. A 0.3 micron porous surface was selected for synthesis of GeneChip® arrays for evaluation in both disease management and gene expression type assays.

Sequence Analysis Array

Sequence analysis or disease management arrays are typically but not limited to "tiling type-arrays." Assay times are relatively short because target concentrations are not limited. The target may be labeled with either fluorescein for direct detection or may be labeled with biotin for detection via signal amplification. A GeneChip® test array containing an HIV sequence was synthesized on a porous glass substrate and a representative HIV assay was performed. The array on this test vehicle is comprised of probes representing the HIV protease and reverse transcriptase genes. The sequence analysis assay was performed on fragmented fluorescein-labeled HIV cRNA target. The surface was scanned at regular intervals and was approaching equilibrium at 6 hours, at which time there was a 4–6 fold increase in hybridization signal intensity over flat glass. Furthermore, at this time the base call discrimination on the porous surface was comparable to the flat surface. The assay time is somewhat longer than typical assays of this type, but as a practical matter, these longer assay times are not material. This assay further verifies that fragmented RNA target can indeed access the probe sites within the porous matrix. Large RNA fragments or reagents do not get trapped within the matrix as there is no increase background signal and there is no reduced dicrimination by probes for target.

Gene Expression Monitoring

A Human 6800 array (HuFl) was synthesized (24 micron features; 16–20 probe pairs/gene) on a 0.3 micron porous silica substrate coated with either BIS or GPS silane (BIS [2-hydroxyethyl]-3-aminopropyl-triethoxysilane or 3-glycidoxylpropyl trimethoxy silane respectively) (Gelest, Tullytown, Pa.) and compared to the appropriately silanated flat glass control. The GPS silane can be deposited in the vapor or solution phase followed by ring opening with acid. Standard quality control assay, which involves hybridization of four biotinylated control gene transcripts as well as twelve biotinylated polynucleotide targets in 6×SSPE buffer for 16 h at 45° C. followed by staining with streptavidin-phycoerythryn complex (SAPE) (Molecular Probes, Eugene OR), showed that the BIS and GPS silanes yield similar hybridization results on a given surface type. A 13-fold enhancement in hybridization signal intensity and average difference (perfect match minus mismatch divided by the total number of probes in a gene) was observed on the porous silica substrates relative to the flat glass with the control gene probe pairs (RNA target). The porous silica substrate surface exhibited a 7-fold increase in the average difference data with the DNA target polynucleotides.

Additional assays involved detection of 9 biotinylated-control genes spiked into the hybridization mixture that contained a background of complex labeled human RNA target. Assays were conducted and materials were obtained as described in The Affymetrix Gene Chip Expression Analysis Manual, 1999. Assays were performed in MES buffer at 45° C. for 1 6 h followed by staining with SAPE. These assays show that the porous silica substrate results in an enhancement in signal of four to six fold with respect to the flat glass surface. Similar values were obtained by looking at the average difference for the control genes. Scatter plots comparing all the genes on the wafer reveal that this trend holds with all the probe sets on the surface and indicate uniform surface response to target.

Further signal amplification by using a second staining step as is commonly done in complex gene expression analysis assays involves treating the SAPE stained surface with an antibody (IgG) followed by a second round of SAPE staining. Again this led to another six fold increase in signal on both surfaces and a four to six fold increase in signal on the porous silica substrates relative to the flat glass. The discrimination on both surfaces is the same. Furthermore, the discrimination on the porous surfaces can be additionally improved by employing more stringent wash conditions.

The results thus show that gene expression monitoroing type assays on porous silica substrates have yielded very high signal intensities under the standard conditions without any assay optimization. Assay optomization which is underway may improve this further. This is significant because, it is generally known that more sensitivity is needed in expression monitoring assays. Additionally, because the signal is much stronger after the first stain, it may be possible to eliminate further staining/signal amplification or cut back the time necessary to run the assay. No increase in nonspecific binding has been observed. Clearly the pores generated between the particles enable diffusion of target, label (SAPE) and antibodies to access the sites. Thus, the porous silica substrates of the present invention appear to be superior to the traditional flat glass substrates in many important aspects and appear to provide many advantages in high-density array synthesis and assays.

Example 2

Particle Templating

The approach of depositing colloidal silica to form a porous layer for DNA arrays shows a tremendous potential for using porous inorganic layers as supports for biosensing devices. Furthermore, it demonstrates a very simple and reproducible technique that can be effective. However, this technique can be further improved with a templating process to further control pore size and porosity, two key aspects of the film morphology. Control of pore size is desirable for at least two aspects of hybridization. First of all, larger pores allow for larger molecules to penetrate the matrix. Thus, arbitrary targets can be selected and the morphology of the porous layer (surface) altered to match. Second it is known from literature that flow in a porous structure is affected by pore size. Larger pores provide the potential advantage of increasing flow rates and thus decreasing hybridization (processing) times, thereby boosting assay performance.

In the technique described, pore size and porosity are controlled by co-depositing sacrificial organic particles, such as polymer (e.g. polymer latex) spheres, with the silica particles, and then burning out the organic material at high temperatures or otherwise removing it. Templating using a sacrificial material is not a new technique in itself. Studies have been conducted where latex particles served as pore templates in gelled silica networks formed from alkoxysilanes. The current approach is novel at least because only particles are used for both the template and the silica matrix that remains after pyrolysis. As is described in the following section, simple modifications of the size, charge, and concentration of the latex can provide a wide range of film morphologies. In typical deposition with alkoxysilanes, more complicated changes in the chemistry and processing are necessary to alter the morphology. Additionally, an important advantage of this approach for the application of polymer synthesis and hybridization is that the voids inherent in the particle system ensure open porosity, whereas films formed from alkoxysilanes with templating can often results in closed pores. The open porosity results in at least some pores being connected to each other, thus allowing fluids to pass into the porous layer of the substrate through the free surface of the substrate.

The polymer to be co-deposited with the silica can be any suitable polymer that achieves the objective of providing the desirable porous structure. One of ordinary skill in the art would understand that several such polymers are available for the present purposes, for example, polystyrene latex can be used.

By the term "co-depositing", it is meant here that the silica and the polymer need not be presented simultaneously so long as-the polymer and the silica occupy the surface of the substrate to provide the desired porosity upon the removal of the polymer.

Figure 3A:
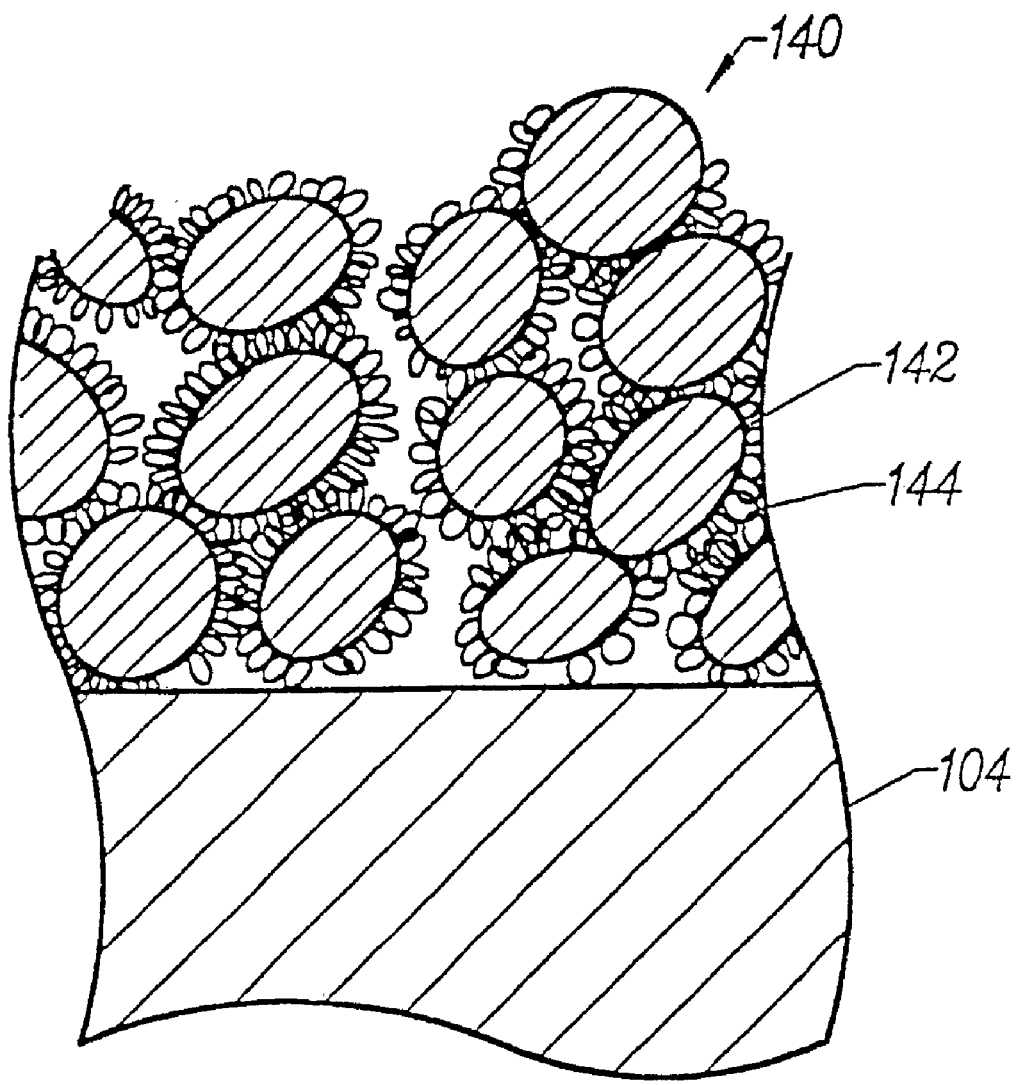
FIG. 3a is a simplified cross section of a portion of a substrate in an intermediate processing state with templating particles that are substantially larger than interstitial silica particles according to one embodiment of the invention.

FIG. 3a is a simplified cross section of a portion of a substrate 140 being processed to form a porous region according to a templating method. Templating particles 142 have been mixed with smaller silica particles 144 (shown without cross hatching for purposes of clarity) and applied to an underlying substrate or support region 104. It is believed that the silica particles coat the templating particles (e.g., latex spheres). After the silica and templating particles are applied to the underlying substrate, the templating material can be burned off, leaving behind a matrix of the silica particles. The particles can be of the same or different size. In one embodiment, the small silica particles further enhance the effective area of the porous layer. Porosity and pore size are increased by voids left from the removal of the templating material. In other embodiments, the remaining silica particle can be sintered or annealed to strengthen the remaining matrix.

Figure 3B:
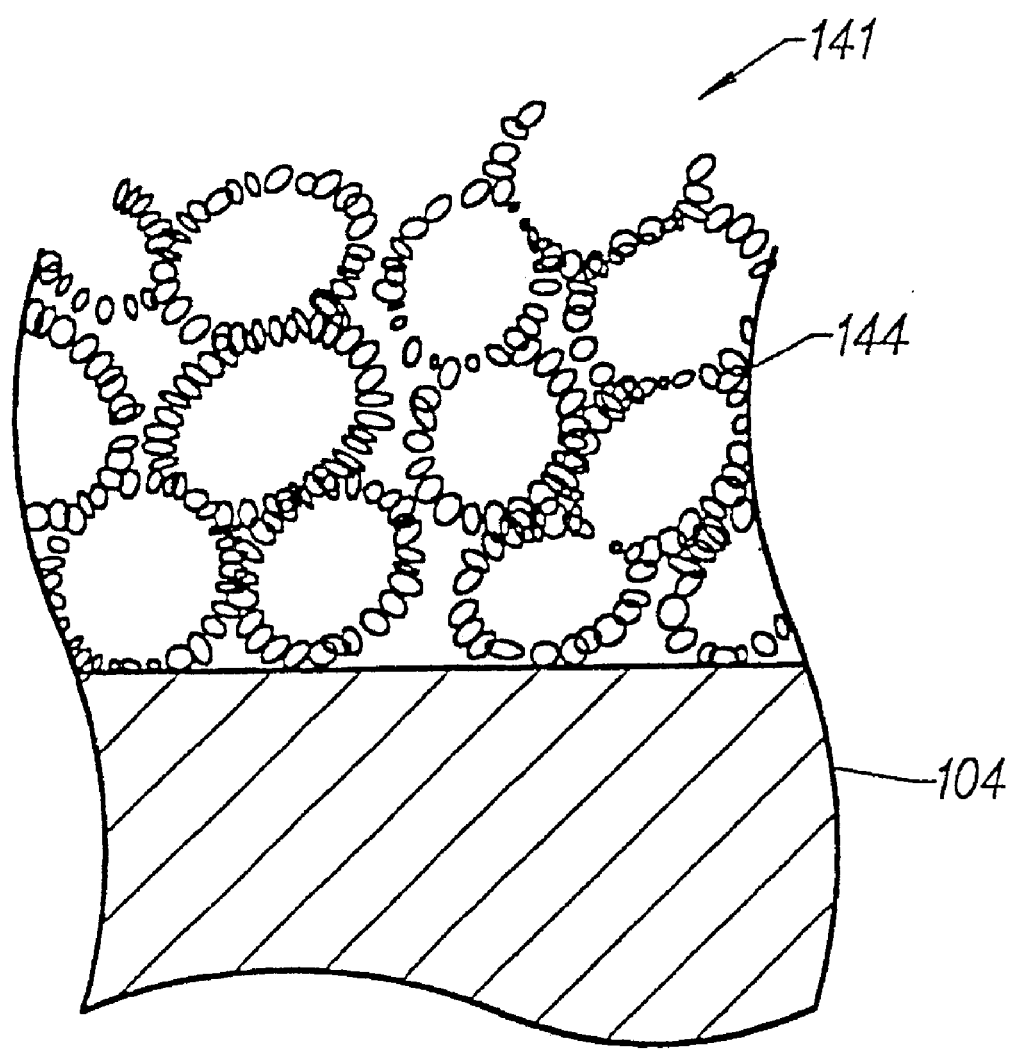
FIG. 3b is a simplified cross section of the portion of the substrate shown in FIG. 3a after the templating material has been removed to form a porous substrate.

FIG. 3b is a simplified cross section of the portion of a porous substrate 141 after the templating particles have been removed, such as in a bum-off process. The bum-off process has removed the templating particles (compare FIG. 3b, reference numeral 142) to leave behind a matrix of silica particles 144. The voids left by the templating particles provide increased effective surface area for the porous substrate. The silica particles may be further processed, such as in an annealing process, to further density the matrix 146 of silica particles.

Figure 4:
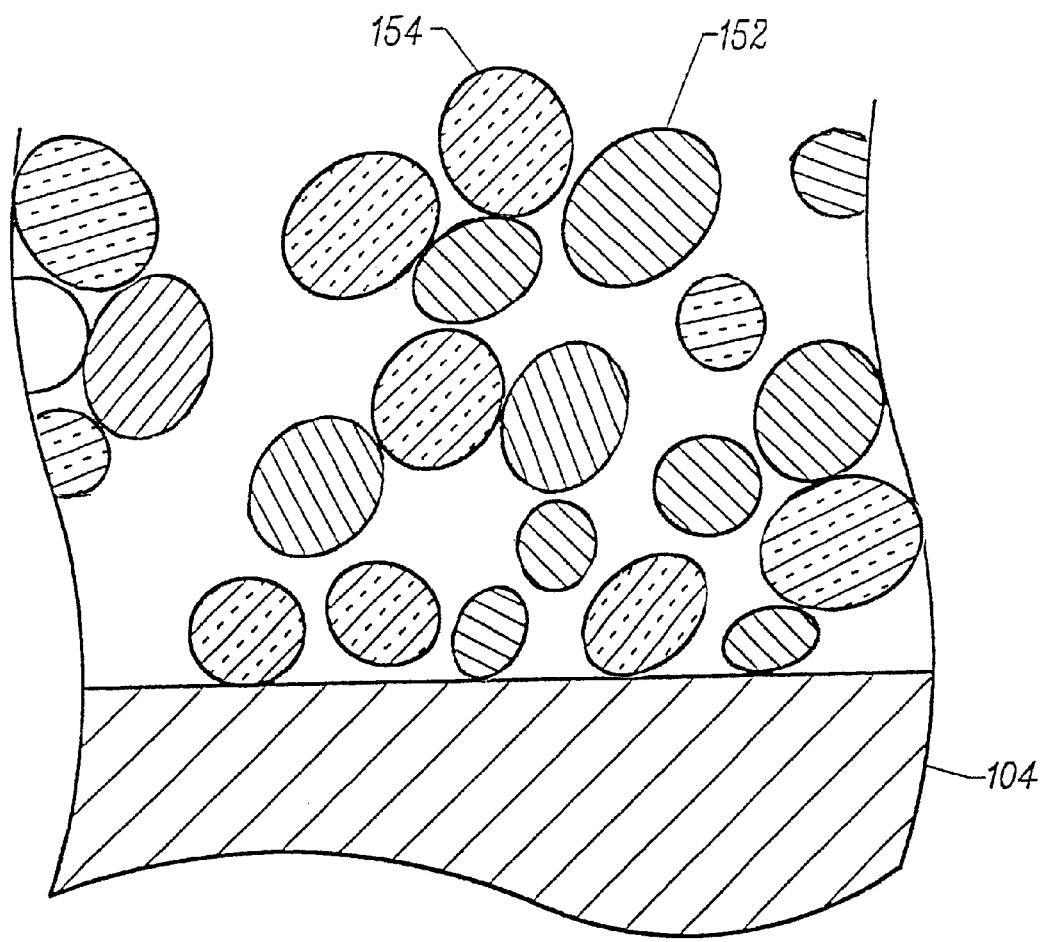
FIG. 4 is a simplified cross section of a portion of a substrate in an intermediate processing state according to another embodiment of the present invention with templating particles of about the same size as silica particles.

FIG. 4 is a simplified cross section of a portion of a substrate 150 being processed to form a porous layer according to another embodiment of the present invention. Templating particles 152 are mixed with silica particles 154 and applied to the underlying substrate 104, such as by spin coating. The templating particles are then removed, as discussed above in reference to FIGS. 3a and 3b, leaving behind a matrix of silica particles. As discussed above in relation to FIG. 1, the section viewed represents particles of essentially the same size that intersect the section plane. The various diameters shown in the figure represent sections of the particles, some of which are not sectioned through their center. It is understood that, generally, each particle touches several other particles, thus when the templating material is removed a silica matrix forms. It is further understood that particles other than silica could be used to form the resulting matrix.

Experimental

Polystyrene-latex dispersions (hereinafter referred to as "latex" or "latex particles") were purchased from INTERFACIAL DYNAMICS CORPORATION of Portland, Oreg. The solutions are stabilized either by negatively charged sulfate groups on the surface or positive amidine groups. Particles with other surface groups could also be used.

In a typical film deposition, the latex and silica solutions are mixed and diluted with pure water to the desired concentrations. Exemplary concentrations include 10:1 by volume latex to 1:1 by volume latex. The solution was then filtered through a 450 nm syringe filter and dispensed onto either glass or a silicon wafer as described previously. Thick yet homogeneous films could be obtained at spin speeds of 1000 rpm and greater (70 second spin time). Thicker films can be obtained by using slower spin speeds, more concentrated solutions, or multiple depositions.

Following spin coating, the films were annealed to remove polymer. Typical conditions were to ramp 2° C./minute to 400° C., dwell 4 hours, then cool to 20° C. at rate of 20° C./minute. Following annealing, a final cleaning step was applied to some samples. This step consisted of immersing the annealed substrate in either piranha solution (30 minutes) and/or etching in 1 M sodium hydroxide at 70° C. (3 minutes).

Results

Atomic force microscopy images of co-deposited 40 nm silica and 60 nm latex particles have been taken before annealing in "phase contrast mode," which shows the distribution of the two types of particles. From the images it can be observed that the deposition is relatively homogeneous. In an ideal distribution, silica and latex particles would alternate in an "array" manner. While the distribution does not reach this level of homogeneity, extensive inter-mingling of the phases can be observed.

The uniqueness and flexibility of using particles to create the final films was demonstrated by two examples. In a first example, 7 nm silica particles were mixed in solution with 100 nm, positively charged latex particles. The charge difference causes the relatively small silica particles to coat the larger latex particles. This sample was dipcoated by withdrawing slowly from solution with the use a variable speed motor. Following annealing, large pores on the order of 100 nm were left behind, with a relatively dense matrix formed from the remaining silica.

Very different structures were created by mixing same-sized, same-charge particles, such as negatively charged 40 nm latex and silica particles of the same size. As silica is typically negatively charged in this environment, the latex and silica do not substantially aggregate. A potential advantage of these films is that the pores left behind by the annealed latex are better connected to each other by the passages between the larger silica particles than in non-templated films. In comparison to the films created with the larger particles and no templating (such as SNOWTEX-ZL), the templated films have pores which are as large (or larger) with surface area that is as high (or higher).

The techniques of light scattering, ellipsometry, and thickness profiling were combined to characterize and estimate the surface area per unit thickness for the templated films. The statistics shown in Table 2 compare a templated film made from 20 nm Latex/SNOWTEX-50 2:1 v/v film with a pure silica film made from SNOWTEX-ZL. This table demonstrates the potential benefit of templated films. Several factors should be noted. First of all, for approximately the same film thickness, the templated film has nearly 3 times the area. Second, the pores in the templated film are actually as large or larger than the pure silica film. The pores in the film made with SNOTEX-ZL (70–100 nm particles) are on the order of 15 nm, whereas the templated film formed with latex particles has 20 nm pores; thus, even though the starting particle size of the pure silica film is approximately 5 times larger than the starting particle size of the templated film, the templated film provides pores that are greater than about 30% larger. Finally, the porosity is much higher, which gives much more room for a potential target to diffuse into the matrix. Thus, the templated film provides a much more efficient substrate for some applications.

TABLE 2

Comparison of Pure and Templated Films

| | Pure 70 nm silica | Templated 20 nm silica (2:1 v/v latex:silica) |
|---|---|---|
| Thickness | 2200 | 2500 |
| Index | 1.37 | 1.16 |
| Porosity | 20% | 65% |
| Area factor | 14.5 | 35.4 |
| Area/thickness (per 0.1 micron) | 6.6 | 14.2 |

Full 20 mer probes were synthesized on the films described in Table 2. A kinetic scan of the adsorbed target vs. time was performed. The conditions used were room temperature, 10 nM target, flow of 4 ml/min, MES buffer. The kinetic scan demonstrates the advantage of using templated films. For a film of similar thickness, a higher signal is reached. The pure non-templated film reaches a signal 14 times that of the flat glass, where the templated glass reaches a signal 40 times that of flat glass. These signals agree well with the area factors estimated in Table 2. Additionally, the templated film reaches equilibrium more quickly (3 hrs vs. 5 hrs.).

Example 3

Etched Sodium Borosilicate Glass

Glass samples of sodium borosilicate glass, suitable for use in a VYCOR™ process, were obtained from DOW CORNING, in the form of 150×150×0.7 mm sheets. The specifications are for a composition of 67.4% $SiO_2$, 25.7% $B_2O_3$, 6.9% $Na_2O$ (by weight), but the precise ratios of components may vary within known ranges. These sheets where then diced into 10×10 mm pieces for testing. The test pieces were annealed at 650° C. for 4 hours to separate the glass into regions of a sodium and boron-rich phase and regions of a silica-rich phase. The samples were then placed in 4% hydrofluoric acid for 20 minutes to preferentially remove (leach) the sodium and boron rich phase, preferentially leaving a matrix of the silica-rich phase. After leaching, the samples were soaked in methanol for approximately 15 minutes. The glass was then cleaned in a sodium hydroxide solution (20 g/liter) that to dissolve silica that might remain in the pores following the leaching step. Finally, the glass was again soaked in methanol for 15 minutes, and allowed to dry at room temperature.

Immediately before silanation, the test pieces were placed in sodium hydroxide solution (20 g/liter) at 70° C. for 3 minutes, followed by water for 15 minutes. This step was used to further insure that the surface would be covered with hydroxyl groups that may have been removed during the HF treatment.

The films are silanated with the same procedures described above as in the case of sol-gel porous silica. Fluorescent staining was performed with 5 mM concentrations of fluorescein, in a manner similar to that described above in the case of sol-gel silica. Exceptions are that the test pieces were mounted on 2×3 in slides using room-temperature vulcanizing ("RTV") silicone glue available from DOW CORNING, and a 20 mil fluoropolymer tape (Polyken) was used as a spacer. This tape showed minimal degradation by solvents over the period for fluorescent staining.

Results

Cross sectional scanning electron microscopy reveals an etched surface layer of approximately 70 microns. It is not clear whether the porosity is interconnected through the depth of the entire layer, although it can be assumed since the etch solution must penetrate into the matrix. Large pores can be observed, on the order of 1000 Å and larger, although rigorous measurements of pore size were not made. Using these measurements, it was estimated that a layer of 70 microns thick could increase the surface area by as much as 400 times over the flat area of the glass.

Staining the surface with fluorescene, as described above, revealed that the etched porous surface yielded a fluorescence signal gain 200 times that of flat glass. Additionally, for the process examined, the etched porous surface actually had a lower background, that is as a percent of the total signal, resulting in an overall increase in the number of sites of over 300 times the flat glass after correction for background.

Additionally, site density was examined using the HPLC quantitation procedure. The HPLC analysis confirmed a factor of 200 increase in accessible sites. However, the chromatogram from the HPLC also showed that there was a significant fraction of fluorescent molecules removed from the surface which were not attached to activated sites (i.e. fluorescent molecules not attached to $C_3$ spacers molecules). These may be molecules which were "stuck" in the matrix during the staining procedure. This result differs from the sol-gel system in which all the observed signal was from covalently attached molecules. This trapping of molecules within the matrix is most likely due to the extremely thick surface layer, and using shorter etch time to obtain a thinner layer could decrease the portion of molecules not attached to synthesis sites.

The above experiments show that the etched borosilicate glass layer of the above-described composition holds significant promise for use as a substrate in a variety of polymer applications, including high-density polymer synthesis and assays. When the polymer is a polynucleotide or a nucleic acid, a number of assays comprising hybridization can be performed, as pointed out in Detailed Description above. When the polymer is a polypeptide or a protein, their kinetic functions and antigen-antibody reactions, can be performed. The borosilicate system can be tailored to suit the application by simply modifying the annealing time (e.g., longer annealing increases pore size) and etching time (e.g., longer etch creates thicker layer).

What is claimed is:

1. A porous substrate for the synthesis of polymer arrays comprising:
   a support region; and
   a porous region on the support region, the porous region being primarily inorganic and having a surface wherein polymers are placed such that polymer arrays are formed, the porous region comprising pores of a pore size of about 2 nm–500 nm, a porosity of about 10–80%, and a thickness of about 0.01 µm to about 70 µm.

2. The porous substrate of claim 1, wherein the porous region is formed by an additive method.

3. The porous substrate of claim 2 wherein the additive method includes the application of colloidal silica on the support region.

4. The porous substrate of claim 2 wherein the additive method includes the application of alkoxysilane on the support region.

5. The porous substrate of claim 2 wherein the porous region has a thickness from about 0.1–1 microns.

6. The porous substrate of claim 2, wherein the porous region has a thickness of from about 0.1 µm to about 0.5 µm.

7. The porous substrate of claim 2, wherein the porous region has a thickness of from about 1 µm to about 20 µm.

8. The porous substrate of claim 2, wherein the porous region is formed by codepositing an organic template material with silica, followed by removing the organic template material.

9. The porous substrate of claim 8 wherein the organic template material comprises particles of about 10–100 nm and the silica comprises particles of about 7–100 nm.

10. The porous substrate of claim 9 wherein an organic template particle size is about equal to a silica particle size.

11. The porous substrate of claim 9 wherein a silica particle size is less than or equal to about ⅔ an organic template particle size.

12. The porous substrate of claim 9 wherein a silica particle size is less than about 10% of an organic template particle size.

13. The porous substrate of claim 8 wherein the organic template material is deposited in a volume ratio to the silica of about 10:1 to 1:10.

14. The porous substrate of claim 8 wherein the organic template material is removed using a baking process at a temperature of above about 150° C.

15. The porous substrate of claim 14 wherein the silica is densified using an annealing process.

16. The porous substrate of claim 8 wherein the porous region has an effective surface area of about 15–40 times a flat substrate with an equivalent two dimensional structure.

17. The porous substrate of claim 1 wherein the porous region comprises silica.

18. The porous substrate of claim 17 wherein the porous region further comprises organic polymer of less than or equal to about 10% mole fraction.

19. The porous substrate of claim 18, wherein the organic polymer coats silica particles of the porous region.

20. The porous substrate of claim 17, wherein the porous region comprises a plurality of pores, each of the plurality of pores having a size of from about 2 to about 100 nm.

21. The porous substrate of claim 17, wherein the porous region comprises a plurality of pores, each of the plurality of pores having a size of from about 2 to about 50 nm.

22. The porous substrate of claim 17, wherein the porous region comprises a plurality of particles, each of the plurality of particles having a size from about 5–500 nm.

23. The porous substrate of claim 17, wherein the porous region comprises a plurality of particles, each of the plurality of particles having a size from about 5–200 nm.

24. The porous substrate of claim 17, wherein the porous region comprises a plurality of particles, each of the plurality of particles having a size from about 70–100 nm.

25. The porous substrate of claim 17, wherein the porous region is silylated with a silyating agent.

26. The porous substrate of claim 25, wherein the silylating agent is selected from the group consisting of N,N-bis(hydroxyethylaminopropyl)triethoxysilane and glycidoxypropyl trimethoxy silane.

27. The porous substrate of claim 1, wherein the porous region has a porosity of from about 20–80%.

28. The porous substrate of claim 1, wherein the porous region has a porosity of from about 50–70%.

29. The porous substrate of claim 1 wherein the porous region is formed by a subtractive method.

30. The porous substrate of claim 29 wherein the porous substrate comprises phase-separable glass, a surface portion of the phase-separable glass being treated to form the porous layer.

31. The porous substrate of claim 30 wherein the phase-separable glass comprises a sodium borosilicate glass.

32. The porous substrate of claim 31 wherein the sodium borosilicate glass has been annealed and leached to provide the porous layer having a thickness of about 70 microns and comprised of a plurality of pores, at least some of the plurality of pores having a pore size greater than about 1000 Å.

33. The porous substrate of claim 29 wherein the porous region has an effective surface area of about 50–400 times a flat substrate with an equivalent two dimensional structure.

34. The substrate of claim 1, further comprising a high density array of nucleic acids immobilized on the surface.

35. A porous substrate for the synthesis of polymer arrays comprising:
a support region; and
a porous region on the support region, the porous region being primarily inorganic and having a surface wherein polymers are placed such that polymer arrays are formed, the porous region comprising pores of a pore size of about 2 nm–500 nm, a porosity of about 10–80%, and a thickness of about 0.01 $\mu$m to about 70 $\mu$m, wherein the porous region is formed by an additive method of codepositing a latex polymer with silica, followed by removing the latex polymer.

36. A porous substrate comprising:
a support region; and
a porous region on the support region, said porous region of about 0.1–0.5 microns thick,
wherein the porous layer comprises an unsintered matrix formed from at least colloidal silica having a particle size of about 70–100 microns, the unsintered matrix defining at least a plurality of open pores having a pore size of about 10–20 nm, and
wherein the porous layer has a porosity of about 10–80%.

37. A porous substrate for the synthesis of polymer arrays comprising:
a support region;
a porous region on the support region, the porous region being primarily inorganic and having a surface including an array of immobilized polymers, the porous region comprising pores of a pore size of about 2 nm to about 500 nm, a porosity of about 10% to about 80%, and a thickness of about 0.01 $\mu$m to about 70 $\mu$m.

38. The porous substrate of claim 37 wherein the polymers include one or more of nucleic acids, polynucleotides, proteins, polypeptides, polysaccharides, polycarbamate or oligosaccharides.

39. The porous substrate of claim 37 wherein the array includes more than 100 different polymers.

40. The porous substrate of claim 39 wherein each different polymer is located on a different surface area of the surface.

41. The porous substrate of claim 39 wherein the surface area has an area between about 1 cm$^2$ to about $10^{-10}$ cm$^2$.

42. The porous substrate of claim 37 wherein the array has a density of greater than 60 different polymers per 1 cm$^2$.

43. The porous substrate of claim 37 wherein each polymer is at least 4 monomers in length.

44. The porous substrate of claim 37 wherein each polymer is between about 4 to about 20 monomers in length.

45. The porous substrate of claim 37 wherein the array has a density of greater than 400 different polymers per 1 cm.

46. A porous substrate for the synthesis of polymer arrays comprising:
a support region;
a porous region on the support region, the porous region being primarily inorganic and having a surface including an array of immobilized nucleic acids, the porous region comprising pores of a pore size of about 2 nm to about 500 nm, a porosity of about 10% to about 80%, and a thickness of about 0.01 $\mu$m to about 70 $\mu$m.

47. The porous substrate of claim 46 wherein the array includes more than 100 different nucleic acids.

48. The porous substrate of claim 46 wherein each different nucleic acid is located on a different surface area of the surface.

49. The porous substrate of claim 48 wherein the surface area has an area between about 1 cm$^2$ to about $10^{-10}$ cm$^2$.

50. The porous substrate of claim 46 wherein the array has a density of greater than 60 different nucleic acids per 1 cm$^2$.

51. The porous substrate of claim 46 wherein each nucleic acid is at least 4 monomers in length.

52. The porous substrate of claim 46 wherein each nucleic acid is between about 4 to about 20 monomers in length.

53. The porous substrate of claim 46 wherein the array has a density of greater than 400 different nucleic acids per 1 cm$^2$.

54. The porous substrate of claim 37 or 46 including a plurality of surface areas, each having an area of less than about $10^{-1}$ cm$^2$.

55. The porous substrate of claim 37 or 46 including a plurality of surface areas, each having an area of less than about $10^{-2}$ cm$^2$.

56. The porous substrate of claim 37 or 46 including a plurality of surface areas, each having an area of less than about $10^{-3}$ cm$^2$.

57. The porous substrate of claim 37 or 46 including a plurality of surface areas, each having an area of less than about $10^{-4}$ cm$^2$.

58. The porous substrate of claim 37 or 46 including a plurality of surface areas, each having an area of less than about $10^{-5}$ cm$^2$.

59. The porous substrate of claim 37 or 46 including a plurality of surface areas, each having an area of less than about $10^{-6}$ cm$^2$.

60. The porous substrate of claim 37 or 46 including a plurality of surface areas, each having an area of less than about $10^{-7}$ cm$^2$.

61. The porous substrate of claim 37 or 46 including a plurality of surface areas, each having an area of less than about $10^{-8}$ cm$^2$.

62. The porous substrate of claim 37 or 46 including a plurality of surface areas, each having an area of less than about $10^{-9}$ cm$^2$.

63. The porous substrate of claim 37 or 46 including a plurality of surface areas, each having an area of less than about $10^{-10}$ cm$^2$.

* * * * *